United States Patent
Kurosaki et al.

(10) Patent No.: US 10,040,270 B2
(45) Date of Patent: Aug. 7, 2018

(54) GALVANNEALED STEEL SHEET AND MANUFACTURING METHOD THEREOF

(71) Applicant: NIPPON STEEL & SUMITOMO METAL CORPORATION, Tokyo (JP)

(72) Inventors: Masao Kurosaki, Tokyo (JP); Jun Maki, Tokyo (JP); Shintaro Yamanaka, Tokyo (JP); Hiroyuki Tanaka, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 183 days.

(21) Appl. No.: 14/889,351

(22) PCT Filed: May 20, 2014

(86) PCT No.: PCT/JP2014/063394
§ 371 (c)(1),
(2) Date: Nov. 5, 2015

(87) PCT Pub. No.: WO2014/189063
PCT Pub. Date: Nov. 27, 2014

(65) Prior Publication Data
US 2016/0082701 A1    Mar. 24, 2016

(30) Foreign Application Priority Data
May 20, 2013    (JP) ................ 2013-106312

(51) Int. Cl.
*B32B 15/01* (2006.01)
*C21D 1/84* (2006.01)
(Continued)

(52) U.S. Cl.
CPC .............. *B32B 15/013* (2013.01); *C21D 1/26* (2013.01); *C21D 1/84* (2013.01); *C21D 6/00* (2013.01);
(Continued)

(58) Field of Classification Search
CPC .......... C21D 8/0278; C21D 9/46; C21D 6/00; C21D 1/84; C21D 1/26; C21D 6/001;
(Continued)

(56) References Cited

U.S. PATENT DOCUMENTS 5,105,454 A * 4/1992 Saito ...................... G01N 23/20
378/70
5,525,431 A    6/1996 Kanamaru et al.
(Continued)

FOREIGN PATENT DOCUMENTS

CN    1460128 A    12/2003
CN    1809650 A    7/2006
(Continued)

OTHER PUBLICATIONS

International Preliminary Report on Patentability and English translation of the Written Opinion of the International Searching Authority (Forms PCT/IB/338, PCT/IB/373, PCT/ISA/237), dated Dec. 3, 2015, for International Application No. PCT/JP2014/063394.
(Continued)

*Primary Examiner* — Michael E. La Villa
(74) *Attorney, Agent, or Firm* — Birch, Stewart, Kolasch & Birch, LLP

(57) ABSTRACT

A galvannealed steel sheet includes a plating layer containing 7.2-10.6 mass % of Fe, 0.2-0.4 mass % of Al, and 0.1 mass % or more of at least one of Ni, Co, Cu, and In, and the balance of Zn and impurities. In a vertical cross-section of the plating layer, an average thickness of a ζ phase is 0.2 μm or less, and an average thickness of a Γ phase is 0.5 μm or less. In the Γ phase, at least one of Ni, Co, Cu, and In are contained at a ratio in the Γ phase of 0.5 mass % or more. A phase existing in contact with the Γ phase is a mixed phase of $Γ_1$ phase and δ phase, and a δ phase percentage defined by "(δ phase/Γ phase contact interface length)/(δ phase/Γ
(Continued)

phase contact interface length+Γ₁ phase/Γ phase contact interface length)×100" is 10% or more.

2 Claims, 11 Drawing Sheets

(51) Int. Cl.
| | | |
|---|---|---|
| *C21D 6/00* | (2006.01) | |
| *C21D 1/26* | (2006.01) | |
| *C22C 18/00* | (2006.01) | |
| *C23C 2/06* | (2006.01) | |
| *C23C 2/28* | (2006.01) | |
| *C23C 2/26* | (2006.01) | |
| *C23C 28/02* | (2006.01) | |
| *C23C 30/00* | (2006.01) | |
| *C23C 2/04* | (2006.01) | |
| *C23C 2/02* | (2006.01) | |
| *C23C 2/40* | (2006.01) | |
| *C21D 8/02* | (2006.01) | |
| *C21D 9/46* | (2006.01) | |

(52) U.S. Cl.
CPC ............ *C21D 8/0278* (2013.01); *C21D 9/46* (2013.01); *C22C 18/00* (2013.01); *C23C 2/02* (2013.01); *C23C 2/04* (2013.01); *C23C 2/06* (2013.01); *C23C 2/26* (2013.01); *C23C 2/28* (2013.01); *C23C 2/40* (2013.01); *C23C 28/02* (2013.01); *C23C 28/021* (2013.01); *C23C 28/023* (2013.01); *C23C 28/025* (2013.01); *C23C 30/00* (2013.01); *C23C 30/005* (2013.01); *Y10T 428/12792* (2015.01); *Y10T 428/12799* (2015.01); *Y10T 428/12882* (2015.01); *Y10T 428/12917* (2015.01); *Y10T 428/12924* (2015.01); *Y10T 428/12931* (2015.01); *Y10T 428/12937* (2015.01); *Y10T 428/12944* (2015.01); *Y10T 428/12972* (2015.01); *Y10T 428/12979* (2015.01)

(58) Field of Classification Search
CPC ........ C21D 6/002; C21D 6/004; C21D 6/005; C21D 6/007; C21D 6/008; C23C 2/06; C23C 2/28; C23C 2/02; C23C 2/40; C23C 2/04; C23C 2/26; C23C 28/02; C23C 28/021; C23C 28/023; C23C 28/025; C23C 30/00; C23C 30/005; C22C 18/00; Y10T 428/12792; Y10T 428/12799; Y10T 428/12931; Y10T 428/12937; Y10T 428/12944; Y10T 428/12882; Y10T 428/1293; Y10T 428/12917; Y10T 428/12924; Y10T 428/12972; Y10T 428/12979; B32B 15/013; B32B 15/01; B32B 15/043; B32B 15/18
See application file for complete search history.

(56) References Cited

U.S. PATENT DOCUMENTS

| | | | |
|---|---|---|---|
| 6,699,592 B2 * | 3/2004 | Taira | C23C 2/26 148/280 |
| 2003/0168134 A1 | 9/2003 | Fujibayashi et al. | |
| 2003/0175548 A1 | 9/2003 | Taira et al. | |
| 2006/0121305 A1 | 6/2006 | Yoshikawa et al. | |
| 2009/0162691 A1 | 6/2009 | Ishizuka et al. | |
| 2011/0284136 A1 | 11/2011 | Kurosaki et al. | |
| 2013/0129924 A1 | 5/2013 | Ishizuka et al. | |

FOREIGN PATENT DOCUMENTS

| | | |
|---|---|---|
| CN | 101163811 A | 4/2008 |
| JP | 53-060332 A | 5/1978 |
| JP | 3-191093 A | 8/1991 |
| JP | 3-249182 A | 11/1991 |
| JP | 6-065701 A | 3/1994 |
| JP | 7-243017 A | 9/1995 |
| JP | 9-165662 A | 6/1997 |
| JP | 10-306361 A | 11/1998 |
| JP | 2005-048198 A | 2/2005 |
| JP | 2005-054199 A | 3/2005 |
| JP | 2007-131910 A | 5/2007 |
| JP | 2010-265525 A | 11/2010 |
| JP | 2012-188676 A | 10/2012 |
| TW | I239357 B | 9/2005 |
| WO | WO 2010/089910 A1 | 8/2010 |

OTHER PUBLICATIONS

International Search Report issued in PCT/JP2014/063394, dated Aug. 19, 2014.
Office Action issued in Taiwanese Patent Application No. 103117666, dated Mar. 27, 2015.
Written Opinion issued in PCT/JP2014/063394, dated Aug. 19, 2014.
Chinese Office Action and Search Report, dated Nov. 28, 2016 for corresponding Chinese Application No. 201480026666.2.

* cited by examiner

Y=0.0222X−0.0625

1μm

GALVANNEALED STEEL SHEET AND MANUFACTURING METHOD THEREOF

TECHNICAL FIELD

The present invention relates to a galvannealed steel sheet used for press forming of automobiles, home electric appliances, construction materials and the like and a manufacturing method thereof, and particularly relates to a galvannealed steel sheet excellent in slidability (flaking resistance), powdering resistance, and conversion treatability and a manufacturing method thereof.

BACKGROUND ART

A galvannealed steel sheet is excellent in weldability and paintability as compared to a galvanized steel sheet. Therefore, the galvannealed steel sheet is widely used in a wide range of fields of automobile vehicle bodies, and further home electric appliances, construction materials, and the like. The alloyed hot-dip galvanized steel sheet to be used for such usages is made available for use after being press formed normally.

In a manufacturing method of the alloyed hot-dip galvanized steel sheet, immediately after hot-dip galvanizing is performed on the surface of a steel sheet, heating to the melting point of zinc or higher and holding are performed to make Fe in the steel sheet diffuse into a plating layer. Then, alloying reaction with Zn is caused to generate a Zn—Fe alloy phase. However, such an alloyed hot-dip galvanized steel sheet has the disadvantage of being poor in press formability as compared to a cold-rolled steel sheet.

The cause of poor press formability lies in a structure of an alloyed hot-dip galvanizing layer. That is, a Zn—Fe alloy plating layer formed by making Fe in the steel sheet diffuse into the plating layer to cause alloying reaction with Zn is a plating layer composed of a $\Gamma$ phase 11, a $\Gamma_1$ phase 12, a $\delta_1$ phase 13, and a $\zeta$ phase 14 formed on a base iron 10 as schematically illustrated in FIG. 1 normally. Further, this plating layer changes in the order of the $\Gamma$ phase→the $\Gamma_1$ phase→the $\delta$ phase→the $\zeta$ phase as the Fe concentration becomes lower.

As for the hardness of these phases, it is about 505 Hv in the $\Gamma_1$ phase in Vickers hardness, which is the highest, and next it is about 326 Hv in the $\Gamma$ phase, it is about 284 to 300 Hv in the $\delta$ phase, and it is about 200 Hv in the $\zeta$ phase. Particularly, the $\Gamma$ phase and the $\Gamma_1$ phase existing in a plating layer region close to the surface of the steel sheet (at a plated steel sheet interface) are hard, and in an upper region of the plating layer, the soft $\zeta$ phase is generated.

The $\zeta$ phase is soft, likely to adhere to a press die, has a high friction coefficient, and is poor in slidability. Therefore, the $\zeta$ phase results in the trigger that causes a phenomenon in which the plating layer adheres to a die to peel off when severe press forming is performed, (which will be flaking, hereinafter). Further, the $\Gamma$ phase and the $\Gamma_1$ phase are hard and brittle, to thus result in the trigger that causes a phenomenon in which the plating layer turns powdery to peel off during press forming, (which will be powdering, hereinafter).

It is important that the slidability should be good when the galvannealed steel sheet is press formed. Therefore, in terms of the slidability, as the plating layer, a film having a high Fe concentration that is alloyed to a high alloying degree, has high hardness, has a high melting point, and is unlikely to cause adhesion is effective, but powdering becomes likely to be caused.

On the other hand, when a plating layer having a low Fe concentration that is alloyed to a low alloying degree and suppresses generations of the $\Gamma$ phase and the $\Gamma_1$ phase is employed in order to prevent the powdering, the slidability deteriorates and the flaking becomes likely to be caused.

In order to improve the press formability of the galvannealed steel sheet, the properties contrary to each other, which are slidability and powdering, are required to be both achieved.

As a technique to improve the press formability of the galvannealed steel sheet, there has been so far proposed a method of manufacturing a $\delta_1$-based galvannealed steel sheet by performing plating in a high-Al bath at a high impregnating sheet temperature defined by the relation to the concentration of Al to suppress alloying reaction, and then performing an alloying treatment so that an outlet side sheet temperature becomes higher than 495° C. to 520° C. in an alloying furnace in a high-frequency induction heating system (see, for example, Patent Literature 1). Further, there has been also proposed a manufacturing method of a galvannealed steel sheet in which hot-dip galvanizing is performed to be immediately held for 2 to 120 seconds in a temperature region of 460 to 530° C., and then is cooled to 250° C. or lower at a cooling rate of 5° C./second or more to form an alloyed plating layer with a $\delta_1$ single phase (see, for example, Patent Literature 2). Further, in order to achieve both surface slidability and powdering resistance, there has been also proposed a manufacturing method of a galvannealed steel sheet in which in an alloying treatment when manufacturing the galvannealed steel sheet, a temperature pattern of the alloying treatment is determined based on a temperature distribution obtained by multiplying each temperature (T) and each time (t) during heating•cooling together and adding the resultants (see, for example, Patent Literature 3).

The object of each of these prior techniques is to, by controlling the alloying degree, achieve hardening of an alloyed hot-dip galvanizing layer and attain achievement of both powdering resistance and flaking resistance to be disadvantages during press forming of the galvannealed steel sheet.

Further, the slidability is greatly affected by a surface flat portion, and therefore there has been proposed a technique of obtaining a galvannealed steel sheet excellent in slidability that has good powdering resistance even in a plating film with a lot of $\zeta$ phases existing in a surface layer by controlling a surface flat portion (see, for example, Patent Literature 4).

The object of this technique is to obtain a galvannealed steel sheet excellent in slidability that has good powdering resistance even in a plating film with a lot of $\zeta$ phases existing in a surface layer by decreasing the alloying degree. However, it is conceived that further improvement in slidability resistance is important because the flaking resistance (slidability resistance) is not sufficient.

Further, as a method of improving press formability of a zinc-based plated steel sheet additionally, there has been widely used a method of applying a high-viscosity lubrication oil. However, there are caused problems such that because the lubrication oil is high in viscosity, painting defects occur in a painting process due to degreasing failure and press performance becomes unstable due to a lack of oil during pressing.

Therefore, there have been proposed a technique of forming a ZnO-based oxide film on the surface of a zinc-based plated steel sheet (see, for example, Patent Literature 5) and a technique of forming an oxide film of Ni oxide (see, for example, Patent Literature 6). However, there is a problem that these oxide films are poor in conversion treatability.

Thus, there has been proposed a technique of forming an Mn-based oxide film as a film whose conversion treatability is improved (see, for example, Patent Literature 7). However, in each of these techniques of forming the oxide-based film, the relationship with the structure of an alloyed hot-dip galvanizing layer has not been examined concretely.

In Patent Literature 8, pre-plating has been proposed, but only the powdering resistance has been evaluated and no improvement of the flaking resistance has been made. Further, in Patent Literature 9, a $\Gamma_2$ phase has been proposed, but only the powdering resistance has been evaluated and no improvement of the flaking resistance has been made. Further, in Patent Literature 10, evaluations of the powdering resistance and the slidability have been performed, but further stability is sometimes required at the time of press forming such that a sheet thickness is reduced practically.

CITATION LIST

Patent Literature

Patent Literature 1: Japanese Laid-open Patent Publication No. 09-165662
Patent Literature 2: Japanese Laid-open Patent Publication No. 2007-131910
Patent Literature 3: Japanese Laid-open Patent Publication No. 2005-054199
Patent Literature 4: Japanese Laid-open Patent Publication No. 2005-048198
Patent Literature 5: Japanese Laid-open Patent Publication No. 53-060332
Patent Literature 6: Japanese Laid-open Patent Publication No. 03-191093
Patent Literature 7: Japanese Laid-open Patent Publication No. 03-249182
Patent Literature 8: Japanese Laid-open Patent Publication No. 2010-265525
Patent Literature 9: Japanese Laid-open Patent Publication No. 10-306361
Patent Literature 10: International Publication Pamphlet No. WO 2010/089910

SUMMARY OF INVENTION

Technical Problem

In consideration of the current situations of the prior techniques, an object of the present invention is to provide a galvannealed steel sheet that achieves both flaking resistance (surface slidability) and powdering resistance during press forming and a manufacturing method thereof.

Solution to Problem

In an alloying treatment of alloying hot-dip galvanizing, when a high-alloying treatment is performed, a lot of $\Gamma$ phases and $\Gamma_1$ phases are generated and the flaking resistance (surface slidability) during press forming are improved, but the powdering resistance deteriorates.

On the other hand, when a low-alloying treatment is performed in the alloying treatment, $\Gamma$ phases and $\Gamma_1$ phases are less generated, $\zeta$ phases are increased, and the powdering resistance during press forming is improved, but the surface slidability (flaking resistance) deteriorate. In the galvannealed steel sheet, generation of the $\Gamma$ phases and the $\Gamma_1$ phases cannot be prevented.

Thus, the present inventors focused on a plating microstructure in the vicinity of a steel sheet and earnestly examined formation of a structure in which a crack does not propagate easily. As a result, they found findings that pre-plating is applied, a heat input during alloying is adjusted, and a content percentage of pre-plating metal to be contained in the $\Gamma$ phase is maintained to a fixed value or more, thereby making it possible to fabricate a plating structure excellent in powdering resistance in which crack propagation during working is suppressed, and further controlling an iron content percentage of a plating layer in a predetermined range makes it possible to obtain plating excellent also in flaking resistance.

Further, they found findings that a pre-plating weight to be provided according to the degree of working that a plated steel sheet is subjected to is adjusted, thereby making it possible to provide an effect of sufficiently improving the powdering resistance.

The present invention has been made based on the above-described findings, and the gist thereof is as follows.

(1) A galvannealed steel sheet, includes: a base iron; and a plating layer containing 7.2 to 10.6 mass % of Fe, 0.2 to 0.4 mass % of Al, and 0.1 mass % or more in total of one type or more types selected from the group consisting of Ni, Co, Cu, and In, and the balance being composed of Zn and impurities, wherein the plating layer is formed on a surface of the base iron, in a vertical cross-section of the plating layer, an average thickness of a $\zeta$ phase is 0.2 μm or less, and an average thickness of $\Gamma$ phases existing in contact with the base iron is 0.5 μm or less, wherein in the $\Gamma$ phase, the one type or more types selected from the group consisting of Ni, Co, Cu, and In are contained 0.5 mass % or more in total in total in the $\Gamma$ phase, and, wherein a phase existing in contact with the $\Gamma$ phase is a mixed phase of $\Gamma_1$ phase and $\delta$ phase, and a $\delta$ phase percentage defined by Expression (1) below is 10% or more.

$$\delta \text{ phase percentage}=(\delta \text{ phase}/\Gamma \text{ phase contact interface length})/(\delta \text{ phase}/\Gamma \text{ phase contact interface length}+\Gamma_1 \text{ phase}/\Gamma \text{ phase contact interface length})\times 100 \quad (1)$$

Here, the $\delta$ phase/$\Gamma$ phase contact interface length is the length of the interface at which the $\delta$ phase and the $\Gamma$ phase are in contact, and the $\Gamma_1$ phase/$\Gamma$ phase contact interface length is the length of the interface at which the $\Gamma_1$ phase and the $\Gamma$ phase are in contact.

(2) A manufacturing method of a galvannealed steel sheet to manufacture the galvannealed steel sheet that is subjected to press working with a sheet thickness reduction percentage (%) of 5% or more, the method includes:

calculating a necessary pre-plating weight (g/m$^2$) based on the sheet thickness reduction percentage (%) during press working of the galvannealed steel sheet according to Expression (2) below, pre-plating with the calculated necessary pre-plating weight (g/m$^2$) or more in total of one type or more types selected from the group consisting of Ni, Co, Cu, and In on a base iron, and dipping the pre-plated base iron into a plating bath containing 0.1 to 0.3 mass % of Al to perform galvanizing thereon; and next after the temperature reaching a maximum temperature at the exit of a heating furnace, performing slow cooling in a soaking furnace adjusting a temperature integral value S calculated by Expression (3) below in a range of 300 or more to less than 800 and performing an alloying treatment.

$$\text{Necessary pre-plating weight}(g/m^2) = 0.0222 \times \text{sheet thickness reduction percentage (\%)} - 0.0625 \quad (2)$$

$$S = (T_{11} - T_0) \times t_1/2 + ((T_{11} - T_0) + (T_{12} - T_0)) \times t_2/2 + \quad (3)$$
$$((T_{12} - T_0) + (T_{21} - T_0)) \times \Delta t/2 +$$
$$((T_{21} - T_0) + (T_{22} - T_0)) \times t_3/2 + (T_{22} - T_0) \times t_4/2$$

Here, $T_0$: 420(° C.)

$T_{11}$: steel sheet temperature at the exit of the heating furnace (° C.)

$T_{12}$: steel sheet temperature at the entry of a cooling zone of the soaking furnace (° C.)

$T_{21}$: steel sheet temperature at the exit of the cooling zone (° C.)

$T_{22}$: steel sheet temperature at the exit of the soaking furnace (° C.)

$t_1$: treatment time from $T_0$ to the exit of the heating furnace (second)

$t_2$: treatment time from the exit of the heating furnace to the entry of the cooling zone of the soaking furnace (second)

$\Delta t$: treatment time from the entry of the cooling zone of the soaking furnace to the exit of the cooling zone (second)

$t_3$: treatment time from the exit of the cooling zone of the soaking furnace to the exit of the soaking furnace (second)

$t_4$: treatment time from the entry of a rapid cooling zone to $T_0$ (second)

Advantageous Effects of Invention

According to the present invention, it is possible to provide a galvannealed steel sheet that achieves both powdering resistance and flaking resistance (surface slidability) during press forming and a manufacturing method thereof.

DESCRIPTION OF EMBODIMENTS

A galvannealed steel sheet is normally manufactured in a manner that a steel sheet annealed in an annealing furnace is dipped into a molten zinc bath (pot) and galvanizing is performed on a surface of the steel sheet, and then the galvanized steel sheet is heated to a maximum reachable temperature in a heating furnace, and after the heating, is slowly cooled in a soaking furnace and is rapidly cooled in a cooling zone.

In this case, the alloying degree is determined by an alloying temperature and/or the like during an alloying treatment. When the alloying degree is low, ζ phases are generated in large amounts and generations of Γ phase and Γ₁ phase are suppressed. The result is that the ζ phase becomes thick and the Γ phase and the Γ₁ phase become thin. On the other hand, when the alloying degree is high, the Γ phase and the Γ₁ phase are generated in large amounts, and generation of the ζ phase is suppressed. The result is that the Γ phase and the Γ₁ phase become thick and the ζ phase becomes thin.

Figure 12:
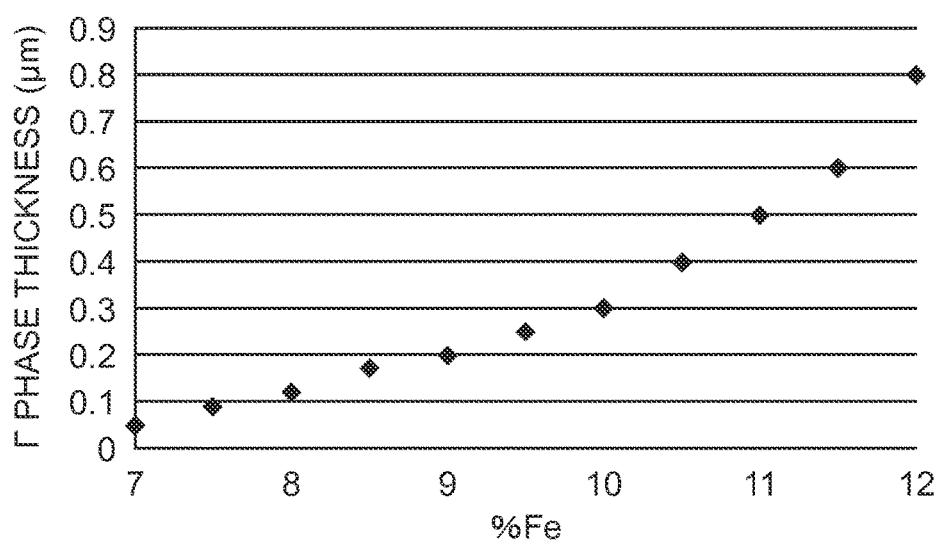
FIG. 12 is a view illustrating the relationship between the Fe concentration in the plating layer and a thickness of the Γ phase.

Then, when the alloying degree is high, the Γ phase and the Γ₁ phase grow thickly at the interface with a base iron, to thus be the cause of powdering to occur during press forming of the galvannealed steel sheet. That is, when the alloying degree is high and the Fe concentration of a plating layer exceeds 11.0 mass %, the Γ phase and the Γ₁ phase grow thickly to cause occurrence of powdering. As illustrated in FIG. 12, it is found that when the Fe concentration of the plating layer increases, the thickness of the Γ phase increases in excess of 0.5 μm being the boundary where occurrence of powdering is caused. On the other hand, when the alloying degree is low, the ζ phase increases in generation amount and grows on the surface of the plating layer, to thus be the cause of flaking to occur during press forming.

The present inventors focused on a microstructure of the plating layer in the vicinity of the interface between the base iron and the plating layer based on the idea that the underlaying cause of powdering and flaking lies in a structure of the plating layer, and earnestly examined a method of forming a structure in which crack propagation is not easily caused during press working.

Figure 10:
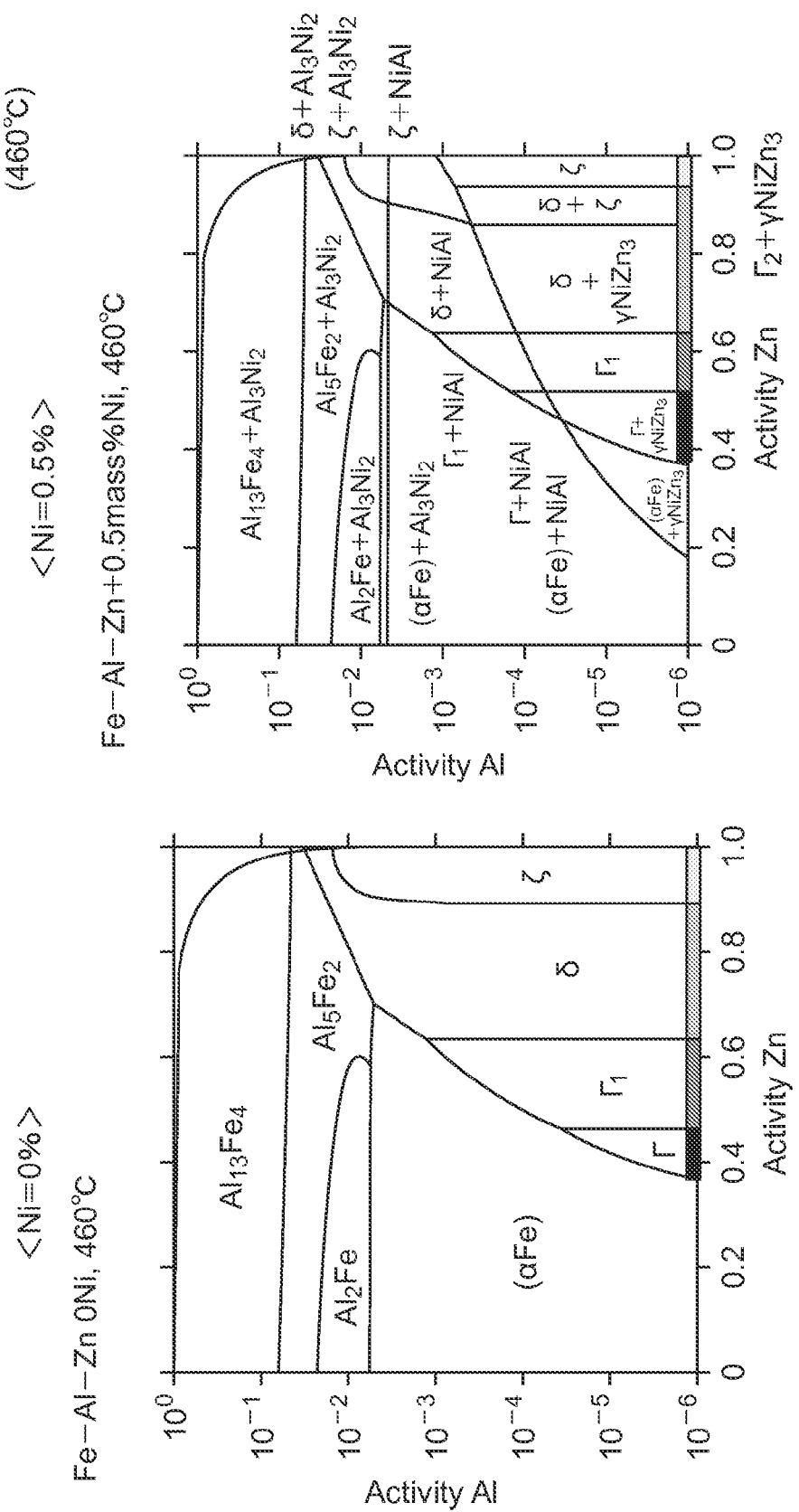
FIG. 10 is a view illustrating an Fe—Al—Zn base state in the case when Ni is contained and an Fe—Al—Zn base state in the case when Ni is not contained.

Further, the present inventor used thermodynamics to perform analysis and found that as illustrated in FIG. 10, an element such as Ni is added to the plating layer, to thereby create a possibility that generations of the Γ phase, the $\Gamma_1$ phase, a δ phase, and the ζ phase can be controlled. As illustrated in FIG. 10, when the case of Ni being not contained and the case of 0.5 mass % of Ni being contained are compared, in the case of Ni being contained, the compound changes to $Fe_2Al_5+Ni_2Al_3$ from $Fe_2Al_5$ and alloying advances. Further, due to the effect of Ni, the $\Gamma_1$ phase becomes unlikely to be generated and a region where the δ phase appears enlarges slightly. Furthermore, the ζ phase also becomes unlikely to be generated. From the above result, the present inventor/inventors focused on the fact that by adding an element such as Ni to the plating layer, microstructures of the Γ phase and the $\Gamma_1$ phase to be generated in the vicinity of the interface with the base iron are controlled.

As a result, the present inventor/inventors found that pre-plating is performed on the steel sheet and a pre-plating weight is adjusted according to the degree of working during press working, thereby making it possible to control microstructures of the Γ phase and the $\Gamma_1$ phase to be generated in the vicinity of the interface with the base iron, resulting in that it is possible to form a plating layer excellent in workability.

Further, the present inventor/inventors found that an input heat amount during alloying is adjusted properly and the Fe concentration of the plating layer is controlled, thereby making it possible to achieve both powdering resistance and flaking resistance. The present invention is made based on the above-described findings, and will be explained in detail below.

In the present invention, as a steel sheet to have plating performed thereon, a steel sheet of ultralow carbon steel such as, for example, IF steel, ultralow carbon Ti steel, or ultralow carbon Ti—Nb steel containing Ti, Nb can be used. Further, a high-strength steel sheet containing a proper amount of Si, Mn, or P being a strengthening element may also be used.

First, in order to confirm differences of powdering resistance and flaking resistance made by variations of Fe concentration, the following experiment was performed.

As a representative example, steel sheets of ultralow carbon Ti—Nb steel were used, and the steel sheets with no pre-plating performed thereon, and the steel sheets with 0.2 g/m² of Ni pre-plating performed thereon using a sulfuric acid Ni bath beforehand were prepared. Thereafter, they were subjected to a reduction·annealing treatment at 800° C. for 90 seconds in a 10% $H_2$—$N_2$ atmosphere, and next were dipped into a Zn plating bath containing 0.13 mass % of Al and having a temperature of 460° C. for 3 seconds, to perform galvanizing thereon.

Thereafter, by a gas wiping method, a plated weight of Zn was adjusted to 45 g/m² constantly, the steel sheets each having had Zn plated thereon were charged into a heating furnace, and a steel sheet temperature ($T_{11}$) at the exit of the heating furnace reached the maximum reachable temperature, and then, when performing slow cooling in a soaking furnace, an alloying treatment was performed while changing a temperature integral value S calculated by Expression (3) below.

$$S = (T_{11} - T_0) \times t_1 / 2 + ((T_{11} - T_0) + (T_{12} - T_0)) \times t_2 / 2 + \\ ((T_{12} - T_0) + (T_{21} - T_0)) \times \Delta t / 2 + \\ ((T_{21} - T_0) + (T_{22} - T_0)) \times t_3 / 2 + (T_{22} - T_0) \times t_4 / 2 \quad (3)$$

Here, $T_0$: 420(° C.)
$T_{11}$: steel sheet temperature at the exit of the heating furnace (° C.)
$T_{12}$: steel sheet temperature at the entry of a cooling zone of the soaking furnace (° C.)
$T_{21}$: steel sheet temperature at the exit of the cooling zone (° C.)
$T_{22}$: steel sheet temperature at the exit of the soaking furnace (° C.)
$t_1$: treatment time from $T_0$ to the exit of the heating furnace (second)
$t_2$: treatment time from the exit of the heating furnace to the entry of the cooling zone of the soaking furnace (second)
$\Delta t$: treatment time from the entry of the cooling zone of the soaking furnace to the exit of the cooling zone (second)
$t_3$: treatment time from the exit of the cooling zone of the soaking furnace to the exit of the soaking furnace (second)
$t_4$: treatment time from the entry of a rapid cooling zone to $T_0$ (second)

Subsequently, each test piece with 35φ was cut out from the alloyed plated steel sheets, and each plating layer was dissolved in a hydrochloric acid containing an inhibitor, to be subjected to chemical analysis to measure the contents of Fe, Ni, and Al in the plating layer.

The powdering resistance and the flaking resistance of the plating layer were evaluated by the following methods.

(Powdering Resistance)

First, each test piece having 40 mm in width and 250 mm in length was cut out from the plated steel sheets. Then, by using a crank press, the test piece was worked on a half-round bead die with r=5 mm so as to have a punch shoulder radius of 5 mm, a die shoulder radius of 5 mm, and a form height of 35 mm. Next, each sheet thickness after being press worked was measured by a micrometer, and a sheet thickness reduction percentage (%) during the press working was calculated by (original sheet thickness−sheet thickness after working)×100/(original sheet thickness), and then the sheet thickness reduction percentage was found to be 10%. Further, the peeled amount of the plating was measured during the working, and the powdering resistance was evaluated based on the following criteria.

Evaluation Criteria

Plating peeled amount less than 5 g/m²: ⊚

Plating peeled amount 5 g/m² or more to less than 10 g/m²: ○

Plating peeled amount 10 g/m² or more to less than 15 g/m²: Δ

Plating peeled amount 15 g/m² or more: X (Flaking Resistance)

First, each test piece having 17 mm in width and 300 mm in length was cut out from the plated steel sheets. Then, as an oil to be applied, a NOX-RUST 530F-40 (PARKER INDUSTRIES, INC.) was applied to the test piece so as to be 1 g/m² as the amount of oil to be applied. Thereafter, a die with a square bead shoulder R of 1.0/3.0 mm was used, a sliding test was performed with a surface pressure of 100 to 600 kgf, and each pull-out load was measured. Then, each friction coefficient was found from the relationship between the surface pressure and the pull-out load. Incidentally, the sliding length was set to 200 mm. The found friction coefficients were evaluated based on the following criteria.

Evaluation Criteria

Friction coefficient less than 0.5: ⊚

Friction coefficient 0.5 or more to less than 0.6: ○

Friction coefficient 0.6 or more to less than 0.8: Δ
Friction coefficient 0.8 or more: X Further, in order to examine a phase structure of the plating layer, a vertical cross-section of the plating layer was observed by a scanning electron microscope (SEM) to measure each average thickness of the Γ phase and the ζ phase in the plating layer. Further, an analysis by an EPMA (Electron Probe MicroAnalyzer) was performed to measure the content of Ni contained in the Γ phase. Further, the plating layer was dissolved in a hydrochloric acid containing an inhibitor to be subjected to chemical analysis, and thereby the average Ni concentration of a plating layer was found.

Table 1 illustrates evaluation results at each temperature integral value S together with the Fe concentration of the plating layer (mass %), (the Fe content in the plating layer will be referred to as Fe concentration, hereinafter), the average Ni concentration of the plating layer (mass %), (which will be referred to as Ni content in the plating layer, hereinafter), the Ni concentration to be contained in the Γ phase at a ratio in the Γ phase (massa), the average thickness of the Γ phase, the average thickness of the ζ phase, the evaluation of powdering resistance, and the evaluation of flaking resistance.

When the temperature integral value S increases, the average Ni concentration of the plating layer increases gradually, and when the temperature integral value S is 800, the average Ni concentration becomes the maximum value and then decreases again. On the other hand, the Ni concentration in the Γ phase decreases rapidly to be 0.5 mass % or less when the temperature integral value becomes 800. This is conceivably because as the alloying advances, the base iron containing the pre-plating and a Zn phase react with each other to form an alloyed plating layer, but when the temperature integral value S becomes 800 or more, consumption of the pre-plated metal ends and reaction with the base iron not containing the pre-plating metal is started, and therefore the average Ni concentration of the plating layer decreases gradually and the Ni concentration in the Γ phase to be generated on the side closest to the base iron decreases rapidly. Consequently, it is found that in order to satisfy both the flaking resistance and the powdering resistance when 0.2 g/m² of the pre-plating is performed, it is necessary to secure 8.2 mass % or more of the Fe concentration of the plating layer, perform the alloying treatment under the condition of the temperature integral value S being

TABLE 1

| | | S | | | | | | | | | | | |
|---|---|---|---|---|---|---|---|---|---|---|---|---|---|
| | | 400 | 500 | 600 | 700 | 750 | 800 | 900 | 1000 | 1200 | 1400 | 1600 | 1800 |
| PRE-PLATING NONE | Fe CONCENTRATION OF PLATING LAYER (MASS %) | 7 | 7.5 | 7.7 | 8.3 | 8.5 | 8.8 | 9.3 | 9.7 | 10.2 | 10.6 | 11 | 11.4 |
| | Γ PHASE THICKNESS (μm) | 0.05 | 0.1 | 0.12 | 0.15 | 0.17 | 0.19 | 0.24 | 0.27 | 0.35 | 0.45 | 0.5 | 0.6 |
| | ζ PHASE THICKNESS (μm) | 0.8 | 0.5 | 0.4 | 0.24 | 0.2 | 0.12 | 0.07 | 0.03 | 0 | 0 | 0 | 0 |
| | AVERAGE Ni CONCENTRATION OF PLATING LAYER (MASS %) | 0 | 0 | 0 | 0 | 0 | 0 | 0 | 0 | 0 | 0 | 0 | 0 |
| | Ni CONCENTRATION OF Γ PHASE (MASS %) | 0 | 0 | 0 | 0 | 0 | 0 | 0 | 0 | 0 | 0 | 0 | 0 |
| | POWDERING | ○ | ○ | Δ | Δ | Δ | Δ | X | X | X | X | X | X |
| | FLAKING | X | X | X | Δ | Δ | ○ | ○ | ○ | ◎ | ◎ | ◎ | ◎ |
| PRE-PLATING Ni = 0.2 g/m2 | Fe CONCENTRATION OF PLATING LAYER (MASS %) | 7.1 | 7.7 | 8.2 | 8.7 | 8.9 | 9.2 | 9.7 | 10.2 | 10.7 | 11.1 | 11.4 | 11.8 |
| | Γ PHASE THICKNESS (μm) | 0.09 | 0.12 | 0.18 | 0.23 | 0.25 | 0.28 | 0.35 | 0.42 | 0.55 | 0.68 | 0.8 | 0.9 |
| | ζ PHASE THICKNESS (μm) | 0.3 | 0.2 | 0.12 | 0.02 | 0.01 | 0 | 0 | 0 | 0 | 0 | 0 | 0 |
| | AVERAGE Ni CONCENTRATION OF PLATING LAYER (MASS %) | 0.36 | 0.36 | 0.37 | 0.38 | 0.4 | 0.44 | 0.42 | 0.42 | 0.4 | 0.39 | 0.38 | 0.37 |
| | Ni CONCENTRATION OF Γ PHASE (MASS %) | 2.3 | 2.2 | 2.1 | 2.1 | 2 | 0.4 | 0.3 | 0.2 | 0 | 0 | 0 | 0 |
| | POWDERING | ◎ | ◎ | ◎ | ◎ | ◎ | Δ | Δ | Δ | X | X | X | X |
| | FLAKING | X | Δ | ○ | ○ | ○ | ◎ | ◎ | ◎ | ◎ | ◎ | ◎ | ◎ |

When the pre-plating is not performed, the value of the temperature integral value S is low, and when the Fe concentration of the plating layer falls below 8.5 mass %, the thickness of the soft ζ phase increases and the flaking resistance decreases. On the contrary, when the temperature integral value S increases and the Fe concentration of the plating layer increases, the flaking resistance improves, but the thickness of the Γ phase increases and the powdering resistance decreases. As above, when the pre-plating was not performed, conditions to satisfy both the flaking resistance and the powdering resistance were not able to be found. On the other hand, when the pre-plating is performed, alloying advances and the Fe concentration of the plating layer increases at the lower temperature integral value S. In order to satisfy the flaking resistance, the thickness of the ζ phase of the plating layer needs to be 0.2 μm or less, and 8.2 mass % or more of the Fe concentration at that time needs to be secured. Further, the powdering resistance deteriorated when the temperature integral value S became 800 or more.

less than 800, and secure 2.0 mass % or more of the Ni concentration in the Γ phase at a ratio in the Γ phase.

Next, in order to confirm effects of the pre-plating, the following experiment was performed. First, as a type of pre-plating, pre-plating containing one type or two or more types selected from the group consisting of Ni, Co, Cu, and In was performed on each steel sheet while changing a pre-plating weight in a range of 0 to 2.0 g/m² by an electrolytic treatment. After the pre-plating was performed, hot dipping was performed by the above-described plating method, and an alloying treatment was performed while changing the temperature integral value S calculated by Expression (3) above.

As a method of performing the galvanizing, a method in which before annealing, on the steel sheet, pre-plating is performed and after annealing, hot dipping is performed directly, and a method in which after annealing, the steel sheet is once cooled to then have pre-plating performed thereon, and thereafter, in a reduction atmosphere, the steel sheet temperature is increased and the steel sheet has hot dipping performed thereon were performed.

Each test piece with 35φ was cut out from the alloyed plated steel sheets and was immersed in a hydrochloric acid containing an inhibitor to dissolve a plating layer to be subjected to chemical analysis, and thereby the Fe concentration of the plating layer was measured.

Figure 1:
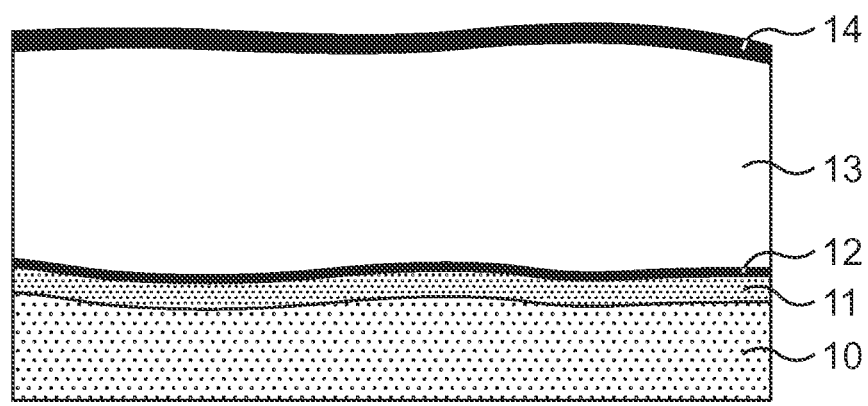
FIG. 1 is a view schematically illustrating a phase structure of a Zn—Fe alloy plating layer.
Figure 2:
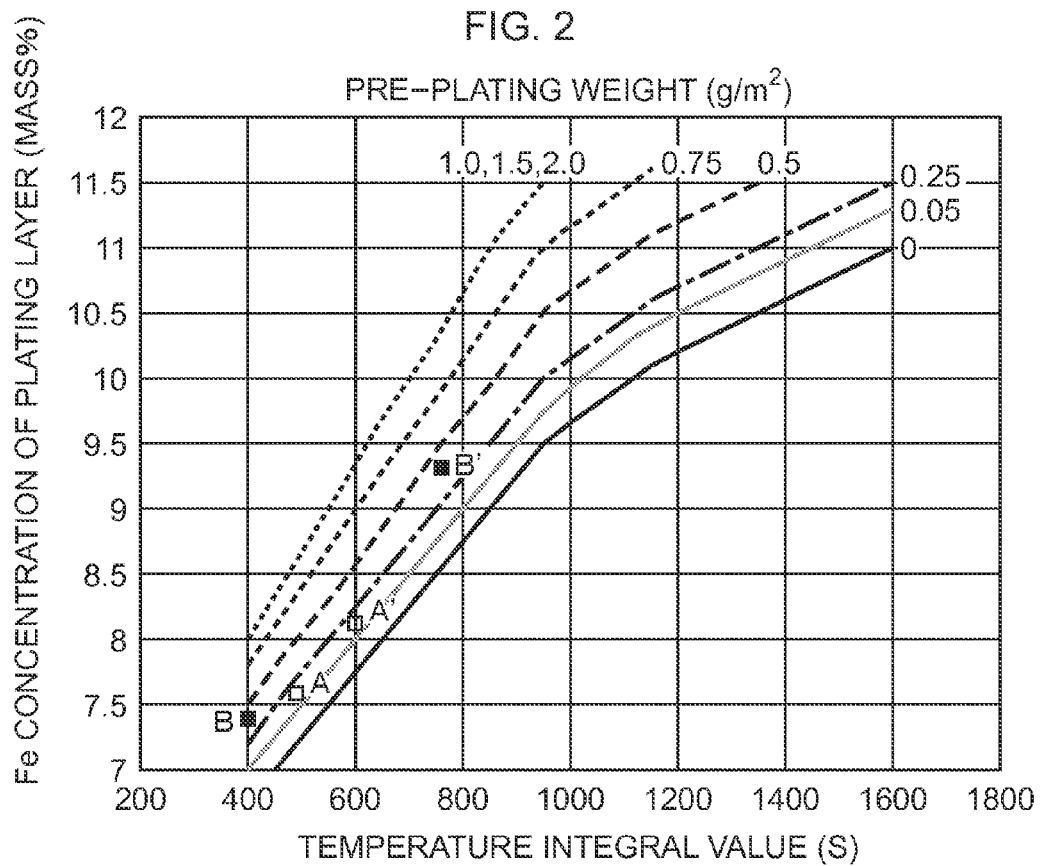
FIG. 2 is a view illustrating the relationship between a temperature integral value (S) and a Fe concentration of a plating layer (mass %)

Measurement results are illustrated in FIG. 2. It is found that as the temperature integral value S is larger and as the pre-plating weight is larger, the alloying advances. Further, it is found that when the pre-plating weight exceeds 1.0 g/m$^2$, an alloying advancing effect is saturated. There is no case that the Fe concentration of the plating layer exceeds 10.6 mass % under the condition of the temperature integral value S being less than 800, so that the upper limit of the Fe concentration in the plating layer results in 10.6 massa. Further, when the Fe concentration is less than 7.2, it is not possible to control the thickness of the ζ phase to 0.2 μm or less regardless of the pre-plating weight, so that the lower limit of the Fe concentration is set to 7.2 mass %.

As long as the pre-plating weight is the same as a whole even if one type or two or more types selected from the group consisting of Ni, Co, Cu, and In are mixed to perform the pre-plating, there is no difference in the pre-plating effect. Further, even if one type or two or more types selected from another group consisting of Cr, Mo, Nb, Fe, and so on are added to the pre-plating, the pre-plating effect does not change.

Further, the pre-plating by the electrolytic treatment method is the most excellent in uniformity and the pre-plating effect is exhibited best, but the equivalent pre-plating effect was able to be confirmed also by an immersion plating method. A liquid to be used for the pre-plating is not limited in particular as long as it contains an element/elements to be plated.

For example, the liquid used for the pre-plating may be any one of a sulfate, chloride salt, a nitrate, formate, and acetate, and there is no difference in the pre-plating effect. Further, there was no difference in the pre-plating effect between the case of the pre-plating being performed before annealing and the case of the pre-plating being performed after annealing.

Next, in order to confirm the pre-plating effect under the circumstances that deformation when working into a practical part is added, the powdering resistance of the plated steel sheet obtained by performing plating thereon after pre-plating was evaluated by the following method.

Each test piece having 40 mm in width×250 mm in length was cut out from the plated steel sheets, and was worked on a half-round bead die with r=5 mm so as to have a punch shoulder radius of 5 mm, a die shoulder radius of 5 mm, and a form height of 20 to 65 mm.

Each sheet thickness after being press worked was measured by a micrometer, and the sheet thickness reduction percentage (%) during the press working was calculated by (original sheet thickness−sheet thickness after working)× 100/(original sheet thickness).

Further, the peeled amount of the plating was measured during the press working, and the powdering resistance was evaluated based on the following criteria.

Evaluation Criteria
Plating peeled amount less than 5 g/m$^2$: ⊚
Plating peeled amount 5 g/m$^2$ or more to less than 10 g/m$^2$: ○
Plating peeled amount 10 g/m$^2$ or more to less than 15 g/m$^2$: Δ

Plating peeled amount 15 g/m$^2$ or more: X

Figure 3:
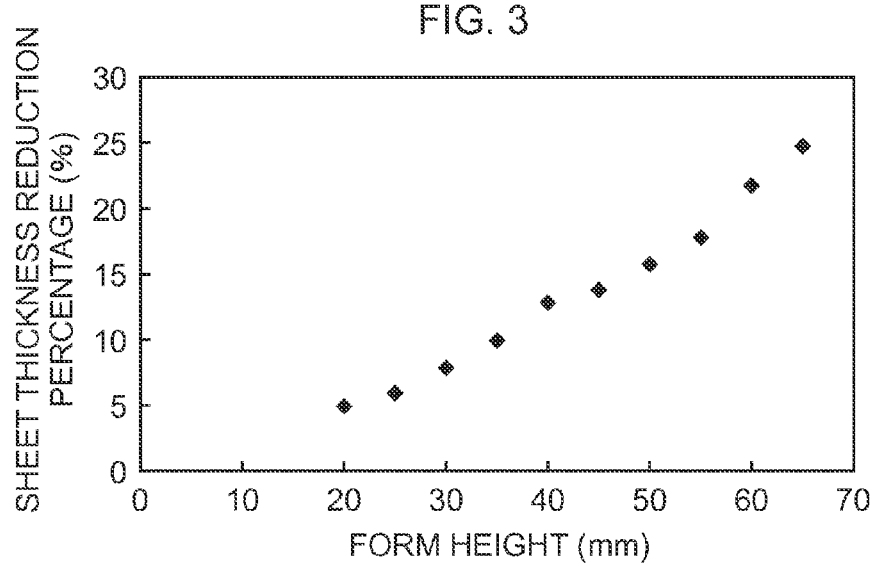
FIG. 3 is a view illustrating the relationship between a form height (mm) and a sheet thickness reduction percentage (%) after working.

In FIG. 3, the relationship between the form height (mm) and the sheet thickness reduction percentage (%) is illustrated. As illustrated in FIG. 3, it is found that when the form height (mm) increases, the sheet thickness reduction percentage (%) increases, to thus make the degree of working become severe. Further, it is found that the sheet thickness reduction percentage when working corresponding to a practical part is added is 5% or more.

Figure 4:
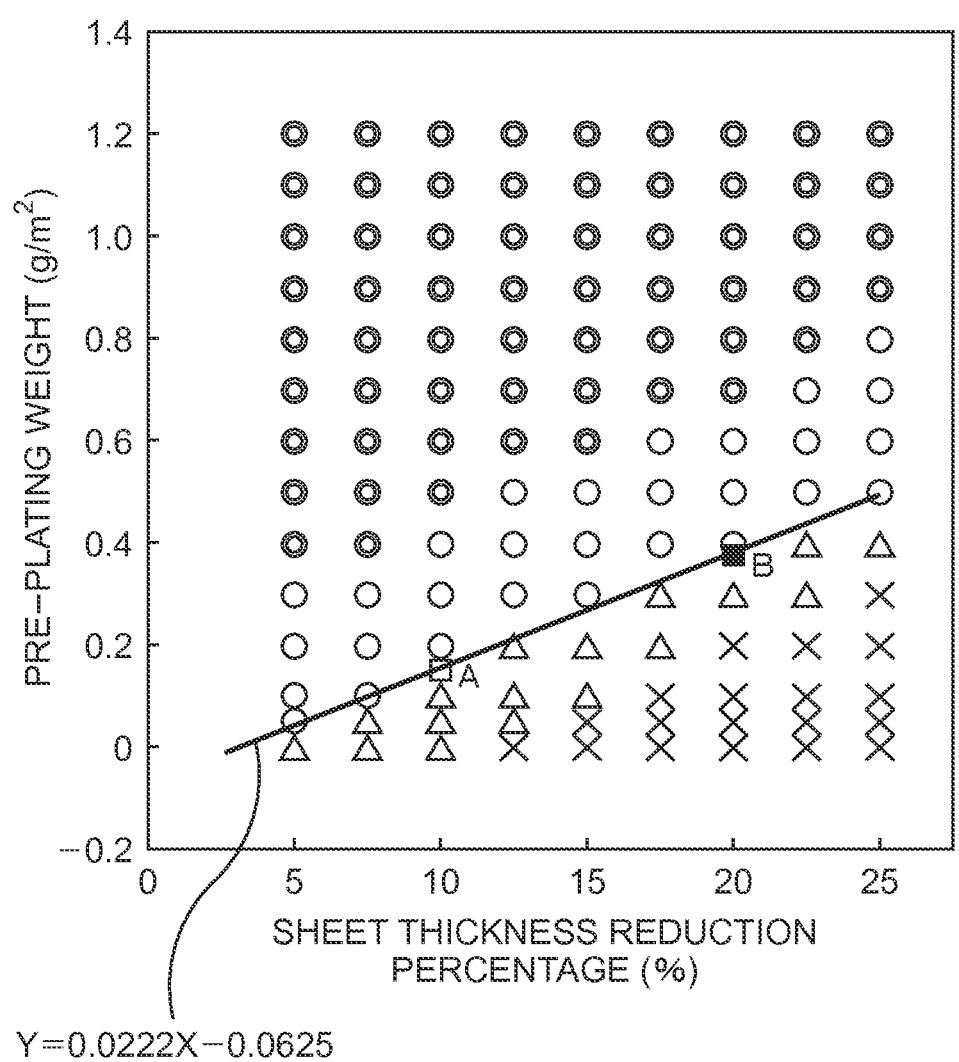
FIG. 4 is a view illustrating evaluation results of powdering in the relationship between the sheet thickness reduction percentage (%) and a pre-plating weight (g/m²)

FIG. 4 illustrates evaluation results of the powdering resistance in the relationship between the sheet thickness reduction percentage (%) and the pre-plating weight (g/m$^2$).

As illustrated in FIG. 4, it is found that when the degree of working is low, namely when the sheet thickness reduction percentage (%) is small, good powdering resistance can be obtained with a small amount of pre-plating weight, but when the sheet thickness reduction percentage (%) increases, the pre-plating weight necessary for obtaining good powdering resistance increases.

Further, in FIG. 4, it was found that when the relationship between the pre-plating weight (g/m$^2$) necessary for obtaining good powdering resistance and the sheet thickness reduction percentage (%) is obtained, the following expression is established.

$$\text{Necessary pre-plating weight}(g/m^2)=0.0222\times\text{sheet thickness reduction percentage (\%)}-0.0625$$

Furthermore, in order to clarify the mechanism in which the powdering resistance improves by the pre-plating, the structure of the interface between the base iron and the plating layer when the pre-plating weight was changed was examined. First, using a focused ion beam system (Focused Ion Beam System), each thin piece for structure observation was cut out from the above-described test pieces, and by a 200-kv-field-emission transmission electron microscope (FE-TEM), the microstructure of the plating layer in the vicinity of the interface between the base iron and the plating layer was observed.

After the microstructure of the plating layer in the vicinity of the interface was photographed, on each crystal grain of the plating layer, a structural analysis was next performed using X-ray diffraction and a componential analysis was performed using energy dispersive X-ray analysis (EDS), to identify the phases (Γ phase, $Γ_1$ phase, δ phase, and ζ phase) constituting the plating layer.

Figure 5A:
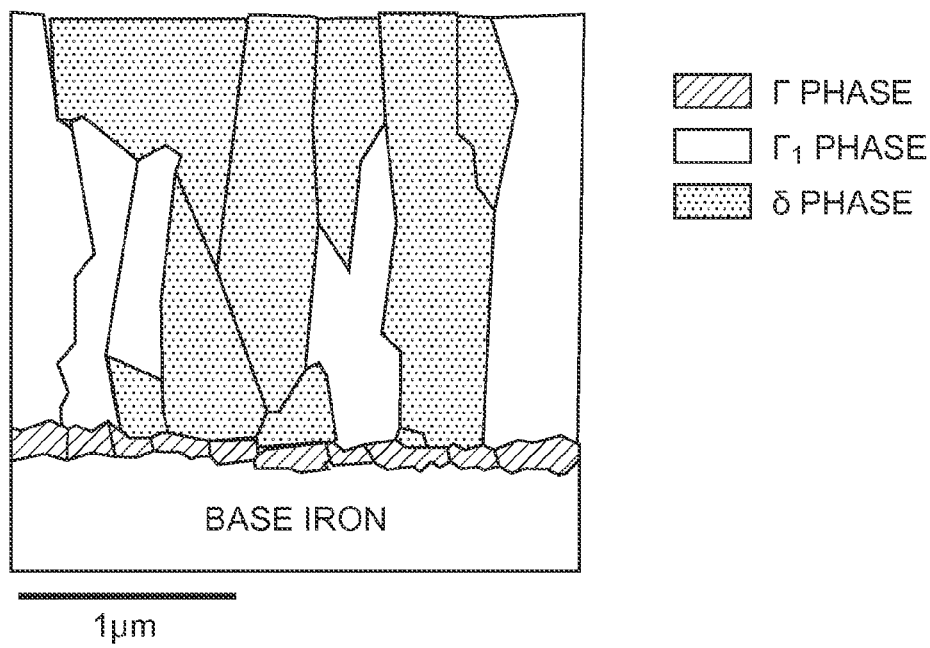
FIG. 5A is a view illustrating a state of a microstructure of a plating layer in the vicinity of the interface between a base iron and the plating layer in the case of pre-plating being performed.
Figure 5B:
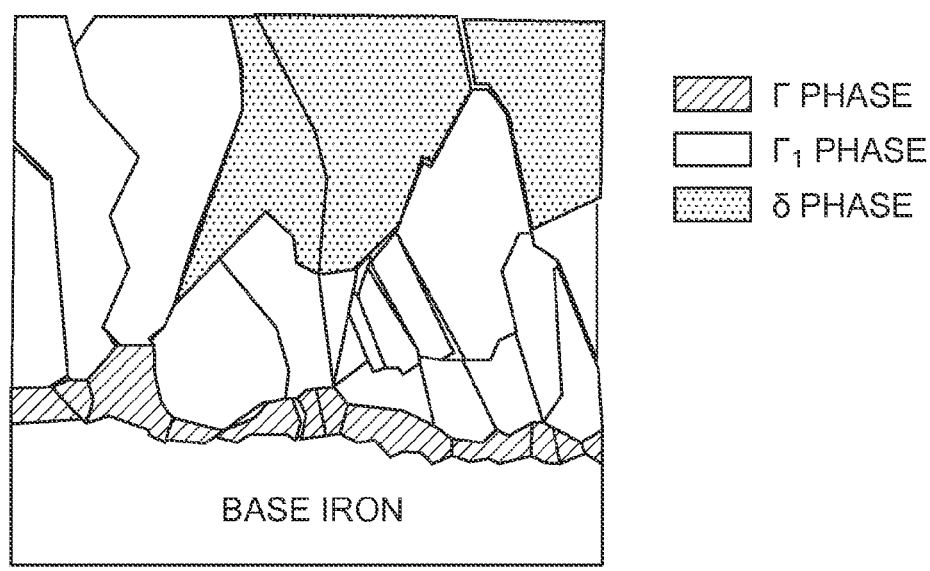
FIG. 5B is a view illustrating a state of a microstructure of a plating layer in the vicinity of the interface between a base iron and plating in the case of no pre-plating being performed.

FIG. 5A and FIG. 5B each illustrate a state of the microstructure of the plating layer in the vicinity of the interface between the base iron and the plating layer. FIG. 5A illustrates the microstructure of the case of the pre-plating being performed, and FIG. 5B illustrates the microstructure of the case of no pre-plating being performed. Incidentally, in the case of the pre-plating being performed, 0.6 g/m$^2$ of Ni was applied.

As illustrated in FIG. 5A and FIG. 5B, the Γ phase existed continuously at the interface between the base iron and the plating layer both in the case of no plating being performed and in the case of the pre-plating being performed.

The present inventor/inventors focused on the phases in contact with the Γ phase to find that when no pre-plating was performed, all the phases were the $Γ_1$ phase as illustrated in FIG. 5B. On the other hand, when the pre-plating was performed, two phases of the Γ1 phase and the δ phase were mixed as illustrated in FIG. 5A.

Then, a percentage of the δ phase in contact with the Γ phase, (which will be δ phase percentage, hereinafter), was measured according to the following definitional equation.

δ phase percentage (%)=(δ phase/Γ phase contact interface length)/(δ phase/Γ phase contact interface length+Γ$_1$ phase/Γ phase contact interface length)×100

Here, the δ phase/Γ phase contact interface length is the length of the interface at which the δ phase and the Γ phase are in contact, and the Γ$_1$ phase/Γ phase contact interface length is the length of the interface at which the Γ$_1$ phase and the Γ phase are in contact.

When no pre-plating was performed, the δ phase percentage was 0%, but when 0.6 g/m$^2$ of Ni was applied as the pre-plating, the δ phase percentage was about 50%.

Figure 6:
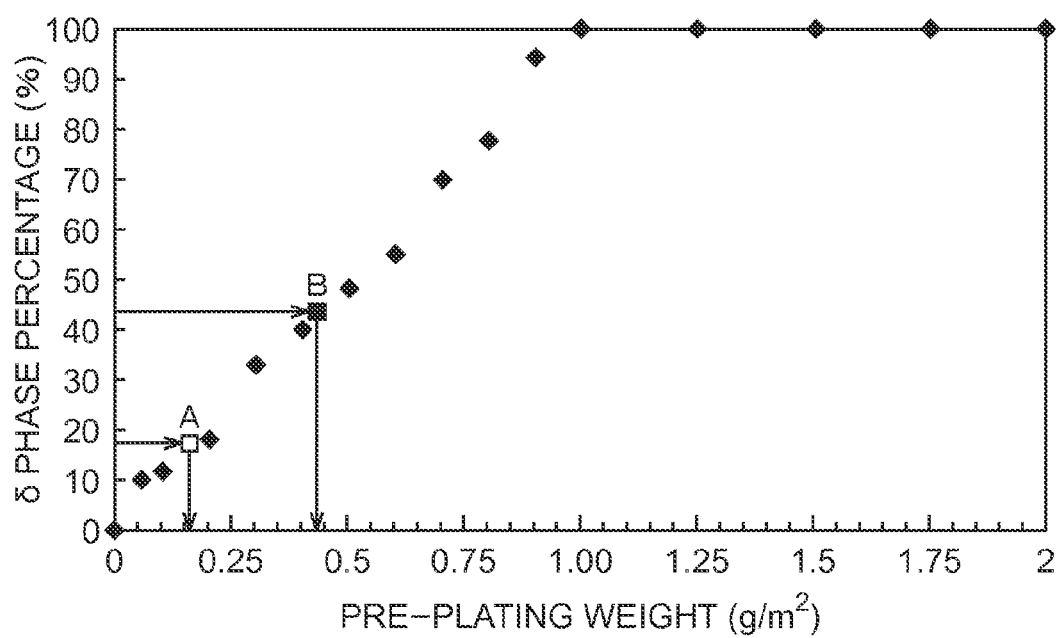
FIG. 6 is a view illustrating the relationship between the pre-plating weight (g/m²) and a δ phase percentage (%)
Figure 7:
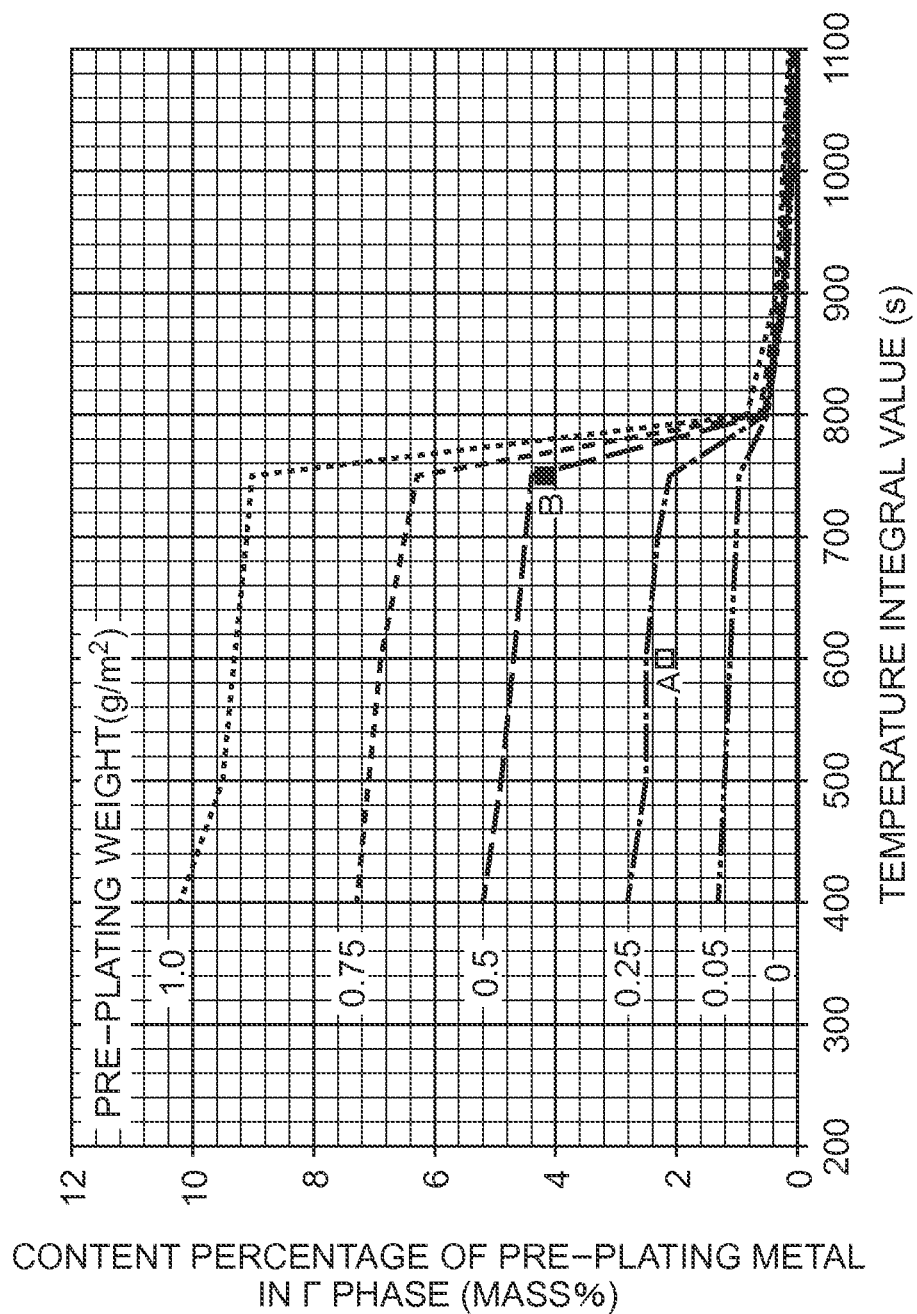
FIG. 7 is a view illustrating the relationship between the temperature integral value S and a concentration of pre-plating metal to be contained in a Γ phase when the pre-plating weight (g/m²) is changed.
Figure 8:
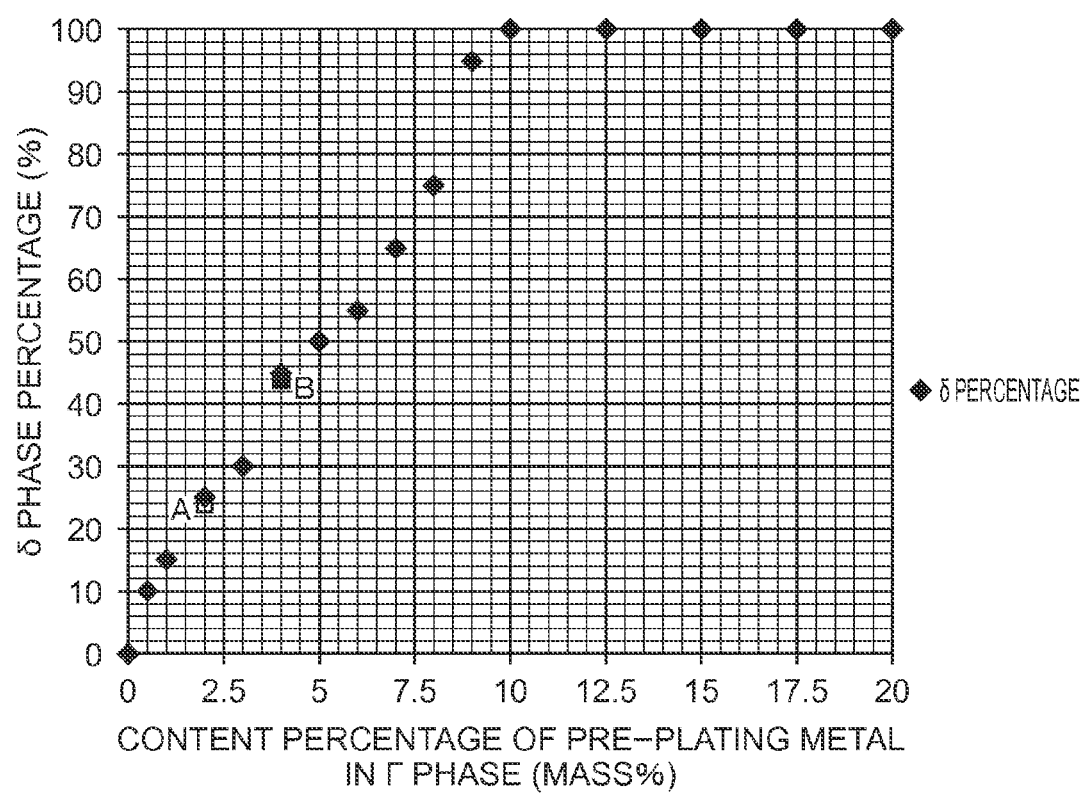
FIG. 8 is a view illustrating the relationship between a content percentage of pre-plating metal in the Γ phase and the δ phase percentage.
Figure 11:
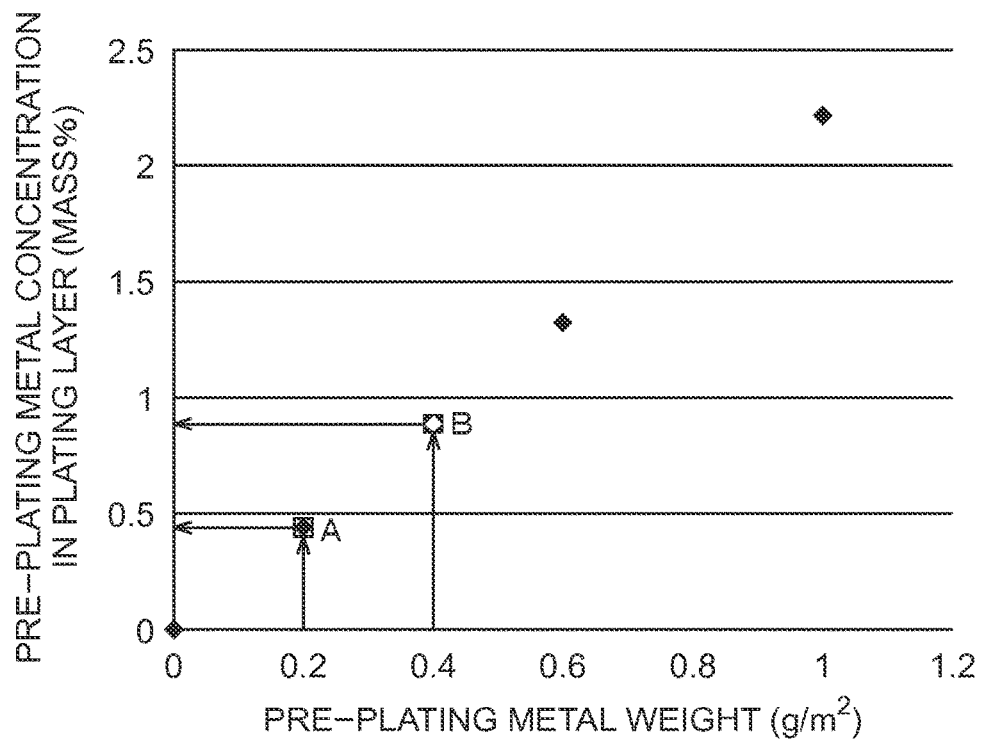
FIG. 11 is a view illustrating the relationship between the pre-plating weight (g/m²) and a concentration of pre-plating metal in the plating layer.

Further, also from the test pieces fabricated while changing the pre-plating weight (g/m$^2$), each thin piece for structure observation was cut out similarly, of which the δ phase percentage (%) was measured. FIG. 6 illustrates the relationship between the pre-plating weight (g/m$^2$) and the δ phase percentage (%) when the alloying treatment was performed with the temperature integral value S being 600. Further, FIG. 7 illustrates the relationship between the temperature integral value S and the concentration of pre-plating metal contained in the Γ phase when the pre-plating weight (g/m$^2$) was changed. Furthermore, FIG. 8 illustrates the relationship between a content percentage of pre-plating metal in the Γ phase and the δ phase percentage. Further, FIG. 11 illustrates results obtained by examining the average concentration of pre-plating metal in the plating layer of the test pieces fabricated while changing the pre-plating weight (g/m$^2$).

As illustrated in FIG. 6, when the alloying treatment was performed with the temperature integral value S being 600, the δ phase percentage (%) increased with the increase in the pre-plating weight (g/m$^2$), when the pre-plating weight was 1 g/m$^2$, the δ phase percentage reached 100%, and when the pre-plating weight was 1 g/m$^2$ or more, the δ phase percentage (%) was constant. Further, this tendency was the same even when the pre-plating containing one type or two or more types selected from the group consisting of Ni, Co, Cu, and In was performed. Further, as is clear from FIG. 7, it is found that when the alloying treatment is performed with the temperature integral value S being less than 800, the content percentage of pre-plating metal in the Γ phase increases with the pre-plating applied weight. Then, as illustrated in FIG. 8, it is found that the δ phase percentage increases with the content percentage of pre-plating metal in the Γ phase.

The reason why the δ phase percentage (%) increases when the pre-plating containing at least one type of the above-described four elements is performed is unclear, but it is inferred that the above-described four elements have a function to make the Γ$_1$ phase unstable and make the δ phase stable thermodynamically.

On the other hand, observing the cross section of the plating layer of the plated steel sheet obtained by performing the pre-plating and then performing the galvanizing thereon to be press worked revealed that a crack in the plating layer to cause powdering propagates through the contact interface between the Γ phase and the Γ$_1$ phase preferentially and halts at the contact interface between the Γ phase and the δ phase.

This is conceivably because the hardness of the Γ$_1$ phase is about 505 Hv in Vickers hardness, which is extremely hard, but the Vickers hardness of the δ phase is 284 to 300 Hv and the Vickers hardness of the Γ phase is 326 Hv, and the crack is most likely to run in the contact interface between the Γ$_1$ phase and the Γ phase, which has a large difference in hardness.

Figure 13:
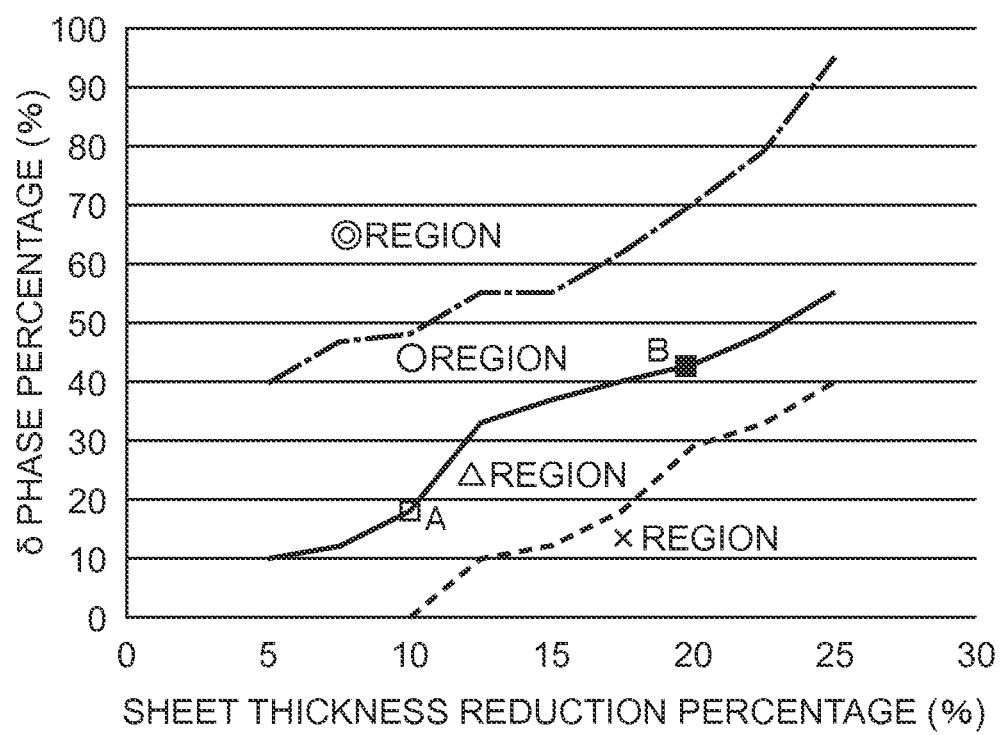
FIG. 13 is a view illustrating the δ phase percentage with good powdering resistance at each sheet thickness reduction percentage.

Further, the reason why the pre-plating weight necessary for obtaining good powdering resistance increases according to the sheet thickness reduction percentage (%) is conceivably because when the sheet thickness reduction percentage (%) is large, it is necessary to increase the δ phase percentage (%) to form the contact interface where a crack does not easily propagate. Further, as a result of examination, it was found that a good region changes depending on the sheet thickness reduction percentage during pressing, but the δ phase percentage needs to be 10% at the minimum as illustrated in FIG. 13. Incidentally, details thereof will be described later.

Figure 9:
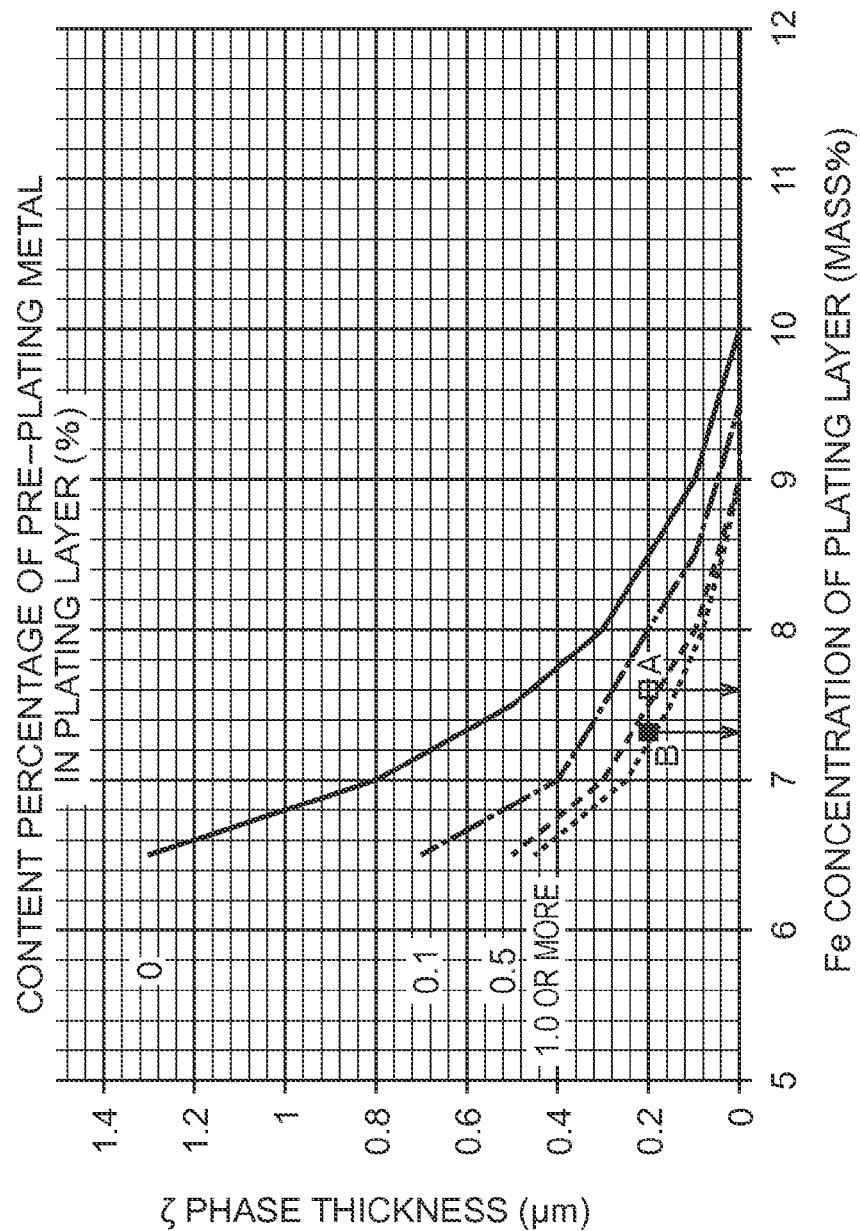
FIG. 9 is a view illustrating the relationship between a content percentage of pre-plating metal to be contained in the plating layer and a thickness of a ζ phase when the pre-plating weight (g/m²) is changed.

Further, the flaking resistance (surface slidability resistance) of the plating layer when the pre-plating was performed was examined by the method similar to that described above. FIG. 9 illustrates the relationship between the content percentage of pre-plating metal contained in the plating layer and the thickness of the ζ phase when the pre-plating weight (g/m$^2$) was changed. In the case of no pre-plating being performed, when the Fe concentration of the plating layer falls below 8.5 mass %, the thickness of the soft ζ phase increases in excess of 0.2 μm and the flaking resistance decreases. Accordingly, it is necessary to make the thickness of the ζ phase become 0.2 μm or less for improving the flaking resistance.

On the other hand, in the case of the pre-plating being performed, according to the concentration of pre-plating metal contained in the plating layer, the thickness of the ζ phase at the same Fe concentration decreases. It was found that the Fe concentration satisfying the condition that the thickness of the ζ phase is 0.2 μm or less, being the condition for securing good flaking resistance, also decreases according to the concentration of pre-plating metal contained in the plating layer.

When the galvanizing is performed, the galvanizing is designed to be performed in a plating bath containing a proper amount of Al. When the content of Al in the plating layer exceeds 0.4 mass %, alloying is suppressed by excessive Al, and thus even when the temperature integral value S is increased, the alloying does not advance, the Fe concentration of the plating layer decreases, and the thickness of the ζ phase increases, resulting in that the flaking resistance decreases. On the other hand, when the content of Al in the plating layer is less than 0.2 mass %, alloying reaction advances at a low temperature at which the ζ phase is likely to grow, so that even when the Fe concentration of the plating layer is maintained to a predetermined value, the ζ phase remains and the flaking resistance decreases. As above, the content of Al in the plating layer is set to 0.2 mass % to 0.4 mass %. Further, Al is more likely to be adsorbed to the base iron than Zn, so that in order to make the content of Al fall within the above-described range, the steel sheet is dipped into a Zn plating bath containing 0.1 mass % to 0.3 mass % of Al to perform the galvanizing thereon.

Further, as illustrated in FIG. 8, when the pre-plating weight (g/m$^2$) increases and the content of one type or two or more types selected from the group consisting of Ni, Co, Cu, and In in the Γ phase exceeds 10 mass % at a ratio in the Γ phase, a fixed value of the δ phase percentage, which is 100%, is expressed and the pre-plating effect is saturated. Therefore, the upper limit of the total content of one type or two or more types selected from the group consisting of Ni, Co, Cu, and In in the Γ phase is preferably set to 10 mass % at a ratio in the Γ phase, and in order to achieve it, the upper limit of the pre-plating weight needs to be adjusted to 1 g/m² as is clear from FIG. 7. Further, as described above, when the temperature integral value S becomes 800 or more, the powdering resistance deteriorates, so that as illustrated in FIG. 7, the lower limit of the total content of one type or two or more types selected from the group consisting of Ni, Co, Cu, and In in the Γ phase is set to 0.5 mass % at a ratio in the Γ phase.

The element/elements as above is/are contained in the plating layer, and the balance is Zn and impurities. Here, as the impurities, ones to be contained in manufacturing processes, and the like are cited as an example.

In the examples illustrated in Table 1, the example without the Ni pre-plating and the example where 0.2 g/m² of Ni pre-plating was performed were explained. As illustrated in FIG. 2, in order to obtain the plating layer with the targeted Fe concentration, the pre-plating weight (g/m²) and the temperature integral value S need to be adjusted. In order to exhibit good flaking resistance when the pre-plating is performed, the thickness of the ζ phase needs to be set to 0.2 μm or less, and from the relationship illustrated in FIG. 9, the necessary Fe concentration of the plating layer can be found. On this occasion, the content percentage of pre-plating metal in the plating layer can be determined from the relationship illustrated in FIG. 11 according to the pre-plating applied weight. The lower limit value of the temperature integral value S for obtaining the necessary Fe concentration found as above can be found from the relationship illustrated in FIG. 2 according to the pre-plating weight. That is, the lower limit value of the temperature integral value S is set to a temperature integral value corresponding to the lower limit value of the Fe concentration in the plating layer to be calculated according to the above-described weight of the pre-plating to be performed for obtaining 0.2 μm or less of the average thickness of the ζ phase. On this occasion, when the temperature integral value S becomes 800 or more, the powdering resistance deteriorates, so that the temperature integral value S needs to be obtained in a range of less than 800. Incidentally, as is found from FIG. 9, when Fe is 7.2 mass % or more, the thickness of the ζ phase becomes 0.2 μm or less on the condition of the pre-plating weight being 1 g/m² or more, and the temperature integral value S at this time is 300 or so, as is found from FIG. 2. From this, the lower limit of the temperature integral value S to be used in the present invention was set to 300.

As above, in order to manufacture the galvannealed steel sheet of the present invention, prior to the manufacture, it is necessary to determine the pre-plating conditions and the alloying conditions as described above. Next, there will be explained how to determine conditions of a manufacturing method while citing concrete examples.

First, when the shape of a portion to be worked is determined, the sheet thickness reduction percentage associated with the working is found. Here, two members (portions A and B) are considered, and the sheet thickness reduction percentage of the portion A is set to 10% and the sheet thickness reduction percentage of the portion B is set to 20%. In this case, as indicated by the points A and B in FIG. 4, it is found that the necessary pre-plating weight needed for obtaining good powdering resistance after press working (falling within a region of ○ and above) can be calculated from Expression (2) described above, and the necessary pre-plating weight of the portion A is 0.16 g/m² and the necessary pre-plating weight of the portion B is 0.38 g/m². Thereby, for example, the pre-plating weight of the portion A is determined to be 0.2 g/m² and the pre-plating weight of the portion B is determined to be 0.4 g/m².

Further, as described above, when the temperature integral value S is 800 or more, the powdering resistance deteriorates. Further, when the thickness of the ζ phase exceeds 0.2 μm, the flaking resistance deteriorates, and therefore, manufacturing conditions are determined on the assumption that these conditions are satisfied.

First, the condition enabling 0.2 μm or less in thickness of the ζ phase is determined. When the pre-plating weight is found by the above-described steps, from the relationship illustrated in FIG. 11, the content of pre-plating metal in the plating layer can be found. At this time, as for the pre-plating metal content, it is assumed that the pre-plating metal is diffused in the plating layer substantially uniformly. As indicated by the points A and B in FIG. 11, in the case of the portion A, about 0.44 mass % of the pre-plating metal is to be contained, and in the case of the portion B, about 0.88 mass % of the pre-plating metal is to be contained.

When the pre-plating metal in the plating layer is determined, the lower limit value of the Fe concentration in the plating layer that enables 0.2 μm or less of the ζ phase can be found from the relationship illustrated in FIG. 9. As indicated by the points A and B in FIG. 9, in the case of the portion A, the lower limit value of the Fe concentration results in about 7.6 mass %, and in the case of the portion B, the lower limit value of the Fe concentration results in about 7.3 mass %.

As described above, when the lower limit value of the Fe concentration is determined, the lower limit value of the temperature integral value S for achieving it can be found from the relationship illustrated in FIG. 2. As indicated by the points A and B in FIG. 2, in the case of the portion A, the lower limit value of the temperature integral value S results in about 480 because the pre-plating weight is 0.2 g/m² and the lower limit value of the Fe concentration is about 7.6 mass %. On the other hand, in the case of the portion B, the lower limit value of the temperature integral value S results in about 400 because the pre-plating weight is 0.4 g/m² and the lower limit value of the Fe concentration is about 7.3 mass %.

From the above, in the case of the portion A, the temperature integral value S can be set to 480 or more to less than 800, and in the case of the portion B, the temperature integral value S can be set to 400 or more to less than 800. Therefore, when the temperature integral value S is set to 600 in the portion A and the temperature integral value S is set to 750 in the portion B in the alloying treatment, for example, as indicated by the points A' and B' in FIG. 2, the Fe concentration of the plating layer results in about 8.2 mass % in the case of the portion A, and the Fe concentration of the plating layer results in about 9.3 mass % in the case of the portion B.

Further, when the temperature integral value S is set to 600 in the portion A and the temperature integral value S is set to 750 in the portion B, as indicated by the points A and B in FIG. 7, the concentration of pre-plating metal in the Γ phase results in about 2.1 mass % at a ratio in the Γ phase in the case of the portion A, and results in about 4.1 mass % at a ratio in the Γ phase in the case of the portion B. Further, when the concentration of pre-plating metal in the Γ phase is found, from the relationship illustrated in FIG. 8, the δ phase percentage can be found. As indicated by the points A and B in FIG. 8, the δ phase percentage results in about 25% in the case of the portion A, and the δ phase percentage results in about 44% in the case of the portion B.

As described above, it is possible to determine the conditions of the manufacturing method. Here, the point in which an interface structure for obtaining good powdering resistance is determined according to the degree of working (sheet thickness reduction percentage) will be explained while referring to FIG. 13. The relationship illustrated in FIG. 13 is calculated from the evaluation result of the powdering resistance at each sheet thickness reduction percentage illustrated in FIG. 4 and the relationship between the pre-plating weight and the δ phase percentage illustrated in FIG. 6. In order to obtain good powdering resistance as the sheet thickness reduction percentage increases, it is found that it is necessary to decrease weak interfaces and increase the δ phase percentage. For example, since the sheet thickness reduction percentage is 10% in the case of the portion A, the δ phase percentage is set to about 18% or more in order to obtain good powdering resistance, and since the sheet thickness reduction percentage is 20% in the case of the portion B, the δ phase percentage is set to about 42% or more in order to obtain good powdering resistance. In order to obtain such an interface structure, the pre-plating weight can be found from the relationship illustrated in FIG. 6 to substantially match the value illustrated in FIG. 4. Thereby, the necessary pre-plating weight can also be found from the relationships illustrated in FIG. 13 and FIG. 6.

After the above-described conditions are determined as above, the galvannealed steel sheet is manufactured. First, after a proper heat treatment is performed, the pre-plating determined as described above is performed. Next, the hot-dip galvanizing is performed, and then the alloying treatment is performed under the conditions determined as described above. On the occasion of alloying, a heating rate $\{(T_{11}-T_0)/t_1\}$ preferably falls within a range of 30° C./s to 60° C./c. When the heating rate (average heating rate) is less than 30° C./s, there is sometimes a case that the Fe concentration of the plating layer increases and the ζ phase increases in thickness, and the powdering resistance and the flaking resistance both deteriorate. Further, when the heating rate exceeds 60° C./s, there is sometimes a case that the concentration of pre-plating metal is likely to decrease and the δ phase percentage cannot be controlled properly.

EXAMPLE

Next, examples of the present invention will be explained, but conditions of the examples are condition examples employed for confirming the applicability and effects of the present invention, and the present invention is not limited to these condition examples. The present invention can employ various conditions as long as the object of the present invention is achieved without departing from the spirit of the invention.

(Pre-Plating)

As a method of performing pre-plating, an electrolytic treatment method or an immersion plating method was used depending on a sample. In the electrolytic treatment method, while using a sulfuric acid bath or a chloride bath containing ions of one type or two or more types selected from the group consisting of Ni, Co, Cu, and In, an electrolytic treatment was performed and pre-plating was performed on a steel sheet. Further, in the immersion plating method, an aqueous solution containing ions of one type or two or more types selected from the group consisting of Ni, Co, Cu, and In and having a temperature of 50° C. was adjusted to pH=1.5 with sulfuric acid, a steel sheet was immersed in this aqueous solution for 10 seconds to make metal displace deposit therein, and pre-plating was performed on the steel sheet. Incidentally, the pre-plating was performed before annealing or after annealing of the steel sheet depending on a sample.

(Hot Dipping)

On each of the steel sheets having had the pre-plating performed thereon, a reduction•annealing treatment was performed at 800° C. for 90 seconds in a 10% $H_2$—$N_2$ atmosphere, and the resultant steel sheets were each dipped into a Zn plating bath containing 0.1 to 0.3 mass % of Al and having a temperature of 460° C. for 3 seconds to perform galvanizing thereon.

After the plating was performed, a plated weight of the Zn plating was adjusted to 45 g/m² constantly by a gas wiping method, and the steel sheet temperature ($T_{11}$) at the exit of a heating furnace reached the maximum reachable temperature, and then when performing slow cooling in a soaking furnace, an alloying treatment was performed on each of plated steel sheets while changing the temperature integral value S calculated by Expression (3) above. Further, heating until the steel sheet temperature ($T_{11}$) at the exit of the heating furnace reached the maximum reachable temperature was performed at a heating rate in a range of 30° C./s or more.

(Phase Structure of Plating Layer)

A vertical cross-section of a plating layer was observed by a scanning electron microscope (SEM) to measure each average thickness of Γ phases and ζ phases of the plating layer.

(Plating Microstructure of Base Iron•Plating Interface)

Each thin piece for structure observation was cut out from test pieces using a focused ion beam system (Focused Ion Beam System), and the microstructure of the plating layer in the vicinity of the interface between a base iron and the plating layer was observed by a 200-kV-field-emission transmission electron microscope (FE-TEM).

After the microstructure of the plating layer in the vicinity of the interface between the base iron and the plating layer was photographed, on each crystal grain of the plating layer, a structural analysis was performed by X-ray diffraction and further a componential analysis was performed using an energy dispersive X-ray analysis (EDS), to then identify phases (Γ phase, $Γ_1$ phase, δ phase, and ζ phase) of the plating layer. Further, the plating layer was dissolved in a hydrochloric acid containing an inhibitor to be subjected to chemical analysis, and thereby the average Ni concentration of the plating layer was found. Furthermore, a percentage of the δ phase in contact with the Γ phase was measured according to the following definitional equation.

δ phase percentage (%)=(δ phase/Γ phase contact interface length)/(δ phase/Γ phase contact interface length+$Γ_1$ phase/Γ phase contact interface length)×100

(Powdering Resistance)

Each test piece having 40 mm in width×250 mm in length was cut out from the plated steel sheets, and was worked on a half-round bead die with r=5 mm so as to have a punch shoulder radius of 5 mm, a die shoulder radius of 5 mm, and a form height of 5 to 65 mm using a crank press. The peeled amount of the plating was measured during the working and was evaluated based on the following criteria.

Evaluation Criteria

Plating peeled amount less than 5 g/m²: ⊚

Plating peeled amount 5 g/m² or more to less than 10 g/m²: ○

Plating peeled amount 10 g/m² or more to less than 15 g/m²: Δ

Plating peeled amount 15 g/m² or more: X (Sheet Thickness Reduction Percentage (%))

Each sheet thickness of the plated steel sheets after being worked was measured using a micrometer, and the sheet thickness reduction percentage (%) was calculated by (original sheet thickness−sheet thickness after working)×100/(original sheet thickness).

(Slidability)

As for a friction coefficient, a sliding test was performed with a surface pressure of 100 to 600 kgf under the conditions: sample size=17 mm×300 mm, pulling speed: 500 mm/min, square bead shoulder R: 1.0/3.0 mm, sliding length: 200 mm, oil to be applied: NOX-RUST 530F-40 (PARKER INDUSTRIES, INC.), and amount of applied oil of 1 g/m².

Each pull-out load was measured, and from the relationship between the surface pressure and the pull-out load, each friction coefficient was found. The found friction coefficients were evaluated based on the following criteria.

Evaluation Criteria

Friction coefficient less than 0.5: ⊚
Friction coefficient 0.5 or more to less than 0.6: ○
Friction coefficient 0.6 or more to less than 0.8: Δ
Friction coefficient 0.8 or more: X The above test results are illustrated in Table 2 collectively.

TABLE 2

| No. | SHEET THICKNESS REDUCTION PERCENTAGE (%) | NECESSARY PRE-PLATING WEIGHT (g/m2) | PRE-PLATING TYPE | PRE-PLATING WEIGHT (g/m2) | PRE-PLATING PERFORMING TIMING | PRE-PLATING METHOD | LOWER LIMIT VALUE OF S | S |
|---|---|---|---|---|---|---|---|---|
| 1 | 5 | 0.05 | Ni | 0.05 | BEFORE ANNEALING | ELECTROLYSIS | 600 | 700 |
| 2 | 5 | 0.05 | Co | 0.05 | BEFORE ANNEALING | ELECTROLYSIS | 600 | 700 |
| 3 | 5 | 0.05 | Cu | 0.05 | BEFORE ANNEALING | ELECTROLYSIS | 600 | 750 |
| 4 | 10 | 0.16 | In | 0.20 | BEFORE ANNEALING | ELECTROLYSIS | 480 | 600 |
| 5 | 15 | 0.27 | Ni—20% Co | 0.30 | BEFORE ANNEALING | IMMERSION | 440 | 650 |
| 6 | 15 | 0.27 | Ni—50% Co | 0.30 | BEFORE ANNEALING | IMMERSION | 440 | 750 |
| 7 | 15 | 0.27 | Ni—50% Cu | 0.30 | AFTER ANNEALING | IMMERSION | 440 | 780 |
| 8 | 20 | 0.38 | Ni—50% In | 0.40 | AFTER ANNEALING | IMMERSION | 400 | 750 |
| 9 | 25 | 0.49 | C0—30% Cu | 0.50 | AFTER ANNEALING | ELECTROLYSIS | 350 | 550 |
| 10 | 25 | 0.49 | Co—10% In | 0.50 | AFTER ANNEALING | ELECTROLYSIS | 350 | 700 |
| 11 | 25 | 0.49 | Cu—50% In | 0.50 | AFTER ANNEALING | ELECTROLYSIS | 350 | 750 |
| 12 | 10 | 0.16 | Ni—10% Co—10% Cu | 0.50 | BEFORE ANNEALING | ELECTROLYSIS | 350 | 750 |
| 13 | 10 | 0.16 | Ni—10% Cu—20% In | 1.00 | BEFORE ANNEALING | ELECTROLYSIS | 300 | 550 |
| 14 | 10 | 0.16 | Ni | 1.00 | BEFORE ANNEALING | IMMERSION | 300 | 500 |
| 15 | 20 | 0.38 | Ni—20% Co | 0.50 | BEFORE ANNEALING | IMMERSION | 350 | 700 |
| 16 | 20 | 0.38 | Cu—50% In | 1.00 | BEFORE ANNEALING | IMMERSION | 300 | 500 |
| 17 | 20 | 0.38 | Ni | 1.00 | BEFORE ANNEALING | ELECTROLYSIS | 300 | 550 |
| 18 | 10 | 0.16 | Ni | 0.40 | BEFORE ANNEALING | IMMERSION | 400 | 500 |
| 19 | 5 | 0.05 | | 0.00 | | | 750 | 1100 |
| 19' | 10 | 0.16 | | 0.00 | | | 750 | 700 |
| 20 | 10 | 0.16 | Ni | 0.20 | AFTER ANNEALING | IMMERSION | 480 | 400 |
| 21 | 25 | 0.49 | Cu | 0.80 | BEFORE ANNEALING | ELECTROLYSIS | 320 | 300 |
| 22 | 10 | 0.16 | In | 0.30 | BEFORE ANNEALING | ELECTROLYSIS | 440 | 850 |
| 23 | 20 | 0.38 | Ni—20% Co | 0.60 | AFTER ANNEALING | IMMERSION | 340 | 1000 |
| 24 | 10 | 0.16 | Ni | 0.30 | BEFORE ANNEALING | ELECTROLYSIS | 440 | 700 |
| 25 | 10 | 0.16 | Ni | 0.30 | BEFORE ANNEALING | ELECTROLYSIS | 440 | 700 |
| 26 | 20 | 0.38 | Ni—50% Cu | 0.20 | BEFORE ANNEALING | ELECTROLYSIS | 480 | 700 |
| 27 | 10 | 0.16 | Cr | 0.50 | BEFORE ANNEALING | ELECTROLYSIS | 350 | 700 |
| 28 | 10 | 0.16 | Ni | 0.40 | BEFORE ANNEALING | IMMERSION | 400 | 500 |

TABLE 2-continued

| No. | HEATING RATE (° C./s) | LOWER LIMIT VALUE OF Fe CONCENTRATION (%) | Fe CONCENTRATION OF PLATING LAYER (%) | Al CONCENTRATION OF PLATING LAYER (%) | PRE-PLATING METAL CONCENTRATION OF PLATING LAYER (%) | Γ PHASE AVERAGE THICKNESS (μm) |
|---|---|---|---|---|---|---|
| 1 | 50 | 8.0 | 8.5 | 0.30 | 0.11 | 0.19 |
| 2 | 50 | 8.0 | 8.5 | 0.35 | 0.11 | 0.20 |
| 3 | 52 | 8.0 | 8.7 | 0.40 | 0.10 | 0.25 |
| 4 | 42 | 7.6 | 8.2 | 0.25 | 0.44 | 0.19 |
| 5 | 45 | 7.5 | 8.6 | 0.20 | 0.60 | 0.25 |
| 6 | 52 | 7.5 | 9.2 | 0.30 | 0.58 | 0.38 |
| 7 | 55 | 7.5 | 9.4 | 0.35 | 0.56 | 0.45 |
| 8 | 52 | 7.3 | 9.3 | 0.30 | 0.88 | 0.40 |
| 9 | 38 | 7.2 | 8.3 | 0.30 | 1.10 | 0.20 |
| 10 | 49 | 7.2 | 9.2 | 0.30 | 1.05 | 0.35 |
| 11 | 52 | 7.2 | 9.4 | 0.30 | 1.00 | 0.45 |
| 12 | 52 | 7.2 | 9.4 | 0.20 | 1.00 | 0.45 |
| 13 | 39 | 7.2 | 9.0 | 0.20 | 2.20 | 0.35 |
| 14 | 35 | 7.2 | 8.7 | 0.40 | 2.30 | 0.25 |
| 15 | 49 | 7.2 | 9.2 | 0.35 | 1.10 | 0.35 |
| 16 | 35 | 7.2 | 8.8 | 0.35 | 2.20 | 0.30 |
| 17 | 39 | 7.2 | 8.8 | 0.35 | 2.20 | 0.30 |
| 18 | 35 | 7.3 | 7.8 | 0.30 | 0.82 | 0.10 |
| 19 | 60 | 8.5 | 9.8 | 0.30 | 0.00 | 0.52 |
| 19' | 50 | 8.5 | 8.2 | 0.30 | 0.00 | 0.10 |
| 20 | 35 | 7.3 | 7.2 | 0.30 | 0.40 | 0.06 |
| 21 | 30 | 7.2 | 7.0 | 0.30 | 1.70 | 0.00 |
| 22 | 60 | 7.5 | 9.4 | 0.20 | 0.70 | 0.72 |
| 23 | 60 | 7.2 | 10.8 | 0.20 | 1.30 | 0.68 |
| 24 | 60 | 7.5 | 7.0 | 0.42 | 0.60 | 0.00 |
| 25 | 50 | 7.5 | 9.0 | 0.18 | 0.60 | 0.10 |
| 26 | 50 | 7.3 | 8.7 | 0.20 | 0.40 | 0.33 |
| 27 | 50 | 7.2 | 8.3 | 0.40 | 1.10 | 0.30 |
| 28 | 25 | 7.3 | 8.8 | 0.30 | 0.80 | 0.60 |

| No. | PRE-PLATING METAL CONCENTRATION OF Γ PHASE (%) | ζ PHASE AVERAGE THICKNESS (μm) | δ PHASE PERCENTAGE (%) | POWDERING RESISTANCE | FLAKING RESISTANCE | NOTE |
|---|---|---|---|---|---|---|
| 1 | 1.00 | 0.18 | 15 | ○ | ○ | INVENTION EXAMPLE |
| 2 | 0.95 | 0.16 | 10 | ○ | ○ | INVENTION EXAMPLE |
| 3 | 0.90 | 0.12 | 12 | ○ | ○ | INVENTION EXAMPLE |
| 4 | 2.10 | 0.15 | 25 | ○ | ○ | INVENTION EXAMPLE |
| 5 | 3.20 | 0.08 | 32 | ○ | ⊚ | INVENTION EXAMPLE |
| 6 | 3.00 | 0.00 | 30 | ○ | ⊚ | INVENTION EXAMPLE |
| 7 | 2.80 | 0.00 | 28 | ○ | ⊚ | INVENTION EXAMPLE |
| 8 | 4.10 | 0.00 | 44 | ○ | ⊚ | INVENTION EXAMPLE |
| 9 | 5.00 | 0.10 | 51 | ○ | ⊚ | INVENTION EXAMPLE |
| 10 | 4.80 | 0.00 | 45 | ○ | ⊚ | INVENTION EXAMPLE |
| 11 | 4.60 | 0,00 | 42 | ○ | ⊚ | INVENTION EXAMPLE |
| 12 | 4.50 | 0.00 | 44 | ⊚ | ⊚ | INVENTION EXAMPLE |
| 13 | 10.10 | 0.00 | 100 | ⊚ | ⊚ | INVENTION EXAMPLE |
| 14 | 10.30 | 0.03 | 100 | ⊚ | ⊚ | INVENTION EXAMPLE |
| 15 | 4.70 | 0.00 | 48 | ⊚ | ⊚ | INVENTION EXAMPLE |
| 16 | 10.00 | 0.02 | 99 | ⊚ | ⊚ | INVENTION EXAMPLE |
| 17 | 10.20 | 0.02 | 100 | ⊚ | ⊚ | INVENTION EXAMPLE |
| 18 | 4.10 | 0.16 | 42 | ⊚ | ○ | INVENTION EXAMPLE |
| 19 | 0.00 | 0.03 | 0 | X | ⊚ | COMPARATIVE EXAMPLE |

TABLE 2-continued

| | | | | | | |
|---|---|---|---|---|---|---|
| 19' | 0.00 | 0.26 | 0 | X | X | COMPARATIVE EXAMPLE |
| 20 | 2.00 | 0.28 | 22 | ⊚ | Δ | COMPARATIVE EXAMPLE |
| 21 | 8.00 | 0.90 | 75 | ⊚ | X | COMPARATIVE EXAMPLE |
| 22 | 0.30 | 0.00 | 2 | Δ | ⊚ | COMPARATIVE EXAMPLE |
| 23 | 0.00 | 0.00 | 0 | Δ | ⊚ | COMPARATIVE EXAMPLE |
| 24 | 2.00 | 5.00 | 20 | ⊚ | X | COMPARATIVE EXAMPLE |
| 25 | 0.20 | 1.50 | 0 | ⊚ | X | COMPARATIVE EXAMPLE |
| 26 | 0.50 | 0.00 | 20 | X | ⊚ | REFERENCE EXAMPLE |
| 27 | 4.90 | 0.05 | 0 | X | ⊚ | COMPARATIVE EXAMPLE |
| 28 | 0.00 | 0.40 | 0 | X | ○ | COMPARATIVE EXAMPLE |

As illustrated in Invention examples of No. 1 to 11, the necessary pre-plating weight (g/m²) corresponding to the sheet thickness reduction percentage was secured, the temperature integral value S was adjusted to be in a proper range of less than 800, and 8.0 or more of the Fe concentration of the plating layer was secured. As a result, it was possible to control the thickness of the ζ phase to a target value or less and obtain a galvannealed steel sheet excellent in powdering resistance and flaking resistance.

Further, as illustrated in Invention examples of No. 12 to 18, even when the pre-plating weight was increased more than the necessary amount, there was no difference in the pre-plating effect, resulting in that a galvannealed steel sheet excellent in powdering resistance and flaking resistance was able to be obtained.

On the other hand, as for the plated steel sheet with no pre-plating performed thereon, such as No. 19, when the sheet thickness reduction percentage was set to 5%, sufficient workability was not able to be obtained even when the Fe concentration of the plating layer was maintained in a predetermined range.

Further, as illustrated in Comparative examples of No. 20 and 21, when the temperature integral value S was low and alloying was insufficient, the Fe concentration of the plating layer was low and the thickness of the ζ phase increased, so that the flaking resistance decreased.

As illustrated in Comparative examples of No. 22 and 23, when the temperature integral value S exceeded 800, on the other hand, the content percentage of pre-plating metal in the Γ phase fell below 0.5% and 10% of the δ phase percentage was not able to be ensured, so that the powdering resistance decreased.

As illustrated in Comparative example of No. 24, when the Al concentration of the plating layer was high, alloying was suppressed by excessive Al. As a result, even when the temperature integral value S was increased, alloying did not advance, the Fe concentration of the plating layer was low, and the thickness of the ζ phase was thick, so that the flaking resistance decreased.

As illustrated in Comparative example of No. 25, when the Al concentration of the plating layer was low, alloying reaction advanced at a low temperature at which the ζ phase grows easily. As a result, even when the Fe concentration of the plating layer was maintained to a predetermined value, the ζ phase remained and the flaking resistance decreased.

Further, as illustrated in Comparative example of No. 27, when one other than the elements selected from Ni, Co, Cu, and In was used as the pre-plating metal, the powdering resistance decreased.

As for No. 26, the pre-plating weight was insufficient with respect to the sheet thickness reduction percentage (%), resulting in that the powdering resistance became insufficient when working in excess of a tolerance was performed.

Further, as for No. 28 being Comparative example, although the heating rate during alloying decreased down to 25° C./s and the thickness of the Γ phase was larger, the ζ phase also remained thickly, resulting in that the powdering resistance and the flaking resistance both deteriorated. This is inferred that when the heating rate was decreased excessively to make the alloying reaction advance, diffusion reaction in the vicinity of a steel sheet interface advanced excessively and the Γ phase grew, but diffusion reaction in the vicinity of a plating surface layer did not advance, and therefore the ζ phase remained.

INDUSTRIAL APPLICABILITY

According to the present invention, contribution can be made to fields of automobiles, home electric appliances, construction materials, and the like.

The invention claimed is:
1. A galvannealed steel sheet, comprising:
a base iron; and
a plating layer containing 7.2 to 10.6 mass % of Fe, 0.2 to 0.4 mass % of Al, and 0.1 mass % or more in total of one type or more types selected from the group consisting of Ni, Co, Cu, and In, and the balance comprising Zn and impurities,
wherein
the plating layer is formed on a surface of the base iron, wherein
in a vertical cross-section of the plating layer, an average thickness of a ζ phase is 0.2 μm or less, and an average thickness of a Γ phase existing in contact with the base iron is 0.5 μm or less,
wherein
the one type or more types selected from the group consisting of Ni, Co, Cu, and In contained in the plating layer are contained in the Γ phase at 0.5 mass % or more in total, and wherein
a phase existing in contact with the Γ phase is a mixed phase of $\Gamma_1$ phase and δ phase, and a δ phase percentage defined by Expression (1) below is 10% or more, δ phase percentage=(δ phase/Γ phase contact interface length)/(δ phase/Γ phase contact interface length+$\Gamma_1$ phase/Γ phase contact interface length)×100    (1), wherein the δ phase/Γ phase contact interface length is the length of the interface at which the δ phase and the Γ phase are in contact, and the $\Gamma_1$ phase/Γ phase contact interface length is the length of the interface at which the $\Gamma_1$ phase and the Γ phase are in contact.

2. A manufacturing method of the galvannealed steel sheet of claim 1 to manufacture the galvannealed steel sheet that is to be subjected to press working with a sheet thickness reduction percentage (%) of 5% or more, the method comprising:
calculating a necessary pre-plating weight (g/m²) based on the sheet thickness reduction percentage (%) during press working of the galvannealed steel sheet according to Expression (2) below;
pre-plating with the calculated necessary pre-plating weight (g/m²) or more in total of one type or more types selected from the group consisting of Ni, Co, Cu, and In on a base iron;
dipping the pre-plated base iron into a plating bath containing 0.1 to 0.3 mass % of Al to perform galvanizing thereon to obtain a galvanized steel sheet;
heating the galvanized steel sheet in a heating furnace;
and after the temperature of the galvanized steel sheet reaching a maximum temperature at the exit of the heating furnace, performing slow cooling of the galvanized steel sheet in a soaking furnace adjusting a temperature integral value S calculated by Expression (3) below in a range of 300 or more to less than 800 and performing an alloying treatment of the galvanized steel sheet, necessary pre-plating weight (g/m²)=0.0222×sheet thickness reduction percentage (%)−0.0625    (2), and $$S = (T_{11} - T_0) \times t_1/2 + ((T_{11} - T_0) + (T_{12} - T_0)) \times t_2/2 + \qquad (3)$$
$$((T_{12} - T_0) + (T_{21} - T_0)) \times \Delta t/2 +$$
$$((T_{21} - T_0) + (T_{22} - T_0)) \times t_3/2 + (T_{22} - T_0) \times t_4/2$$

wherein $T_0$=420 (° C.),
$T_{11}$=steel sheet temperature at the exit of the heating furnace (° C.),
$T_{12}$=steel sheet temperature at the entry of a cooling zone of the soaking furnace (° C.),
$T_{21}$=steel sheet temperature at the exit of the cooling zone (° C.),
$T_{22}$=steel sheet temperature at the exit of the soaking furnace (° C.),
$t_1$=treatment time from $T_0$ to the exit of the heating furnace (second),
$t_2$=treatment time from the exit of the heating furnace to the entry of the cooling zone of the soaking furnace (second),
Δt=treatment time from the entry of the cooling zone of the soaking furnace to the exit of the cooling zone (second),
$t_3$=treatment time from the exit of the cooling zone of the soaking furnace to the exit of the soaking furnace (second), and
$t_4$=treatment time from the entry of a rapid cooling zone to $T_0$ (second).

* * * * *